(12) United States Patent
Shima et al.

(10) Patent No.: US 9,488,867 B2
(45) Date of Patent: Nov. 8, 2016

(54) LIQUID CRYSTAL DISPLAY DEVICE

(71) Applicant: TOPPAN PRINTING CO., LTD., Tokyo (JP)

(72) Inventors: Yasuhiro Shima, Tokyo (JP); Hisashi Nakada, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/541,848

(22) Filed: Nov. 14, 2014

(65) Prior Publication Data

US 2015/0070611 A1   Mar. 12, 2015

Related U.S. Application Data

(63) Continuation of application No. PCT/JP2013/062822, filed on May 7, 2013.

(30) Foreign Application Priority Data

May 17, 2012   (JP) .................................. 2012-113299

(51) Int. Cl.
   *G02F 1/1337*   (2006.01)
   *G02F 1/1343*   (2006.01)
   (Continued)

(52) U.S. Cl.
   CPC ............. *G02F 1/1337* (2013.01); *G02F 1/137* (2013.01); *G02F 1/1368* (2013.01);
   (Continued)

(58) Field of Classification Search
   CPC .................. G02F 1/134336; G02F 1/134309;
   G02F 2001/134381; G02F 2001/133742;
   G02F 2001/134345; G02F 2001/133761
   See application file for complete search history.

(56) References Cited

U.S. PATENT DOCUMENTS

2006/0066799 A1*   3/2006   Mizusako ......... G02F 1/133707
                                                   349/142
2007/0002201 A1*   1/2007   You ..................... G02F 1/1368
                                                   349/43

(Continued)

FOREIGN PATENT DOCUMENTS

CN              1755464 A       4/2006
CN           101568875 A      10/2009
(Continued)

OTHER PUBLICATIONS

International Search Report mailed Aug. 6, 2013, in corresponding International Patent Application No. PCT/JP2013/062822.
(Continued)

*Primary Examiner* — Dennis Y Kim

(57) ABSTRACT

Pixels of a liquid crystal display device have a polygonal shape long in the longitudinal direction. The pixel is divided into two by a center line, and is line-symmetric with respect to the center line. Pixel electrodes are divided line-symmetrically with respect to the center line. Streaks are formed on the surfaces of the pixel electrodes. Common electrodes are divided line-symmetrically with respect to the center line. Positions of the common electrodes in the lateral direction shift from the pixel electrodes in directions apart from the center line. A film gives a pretilt angle to liquid crystal molecules to tilt the lengthwise direction of the liquid crystal molecules from the vertical direction in the directions in which the common electrodes shift from the pixel electrodes.

5 Claims, 19 Drawing Sheets

(51) Int. Cl.
*G02F 1/1333* (2006.01)
*G02F 1/1335* (2006.01)
*G02F 1/1368* (2006.01)
*G02F 1/137* (2006.01)

(52) U.S. Cl.
CPC .. *G02F 1/133345* (2013.01); *G02F 1/133512* (2013.01); *G02F 1/133514* (2013.01); *G02F 1/133753* (2013.01); *G02F 1/134309* (2013.01); *G02F 1/134336* (2013.01); *G02F 2001/13712* (2013.01); *G02F 2001/133742* (2013.01); *G02F 2001/133749* (2013.01); *G02F 2001/133761* (2013.01); *G02F 2001/134345* (2013.01); *G02F 2001/134381* (2013.01); *G02F 2201/52* (2013.01)

(56) References Cited

U.S. PATENT DOCUMENTS

2009/0279034 A1* 11/2009 Shoraku ............ G02F 1/133753
 349/129
2012/0154716 A1* 6/2012 Kaise ................ G02F 1/134336
 349/85

FOREIGN PATENT DOCUMENTS

| | | |
|---|---|---|
| CN | 101828142 | 9/2010 |
| JP | 2005-55928 | 3/2005 |
| JP | 2006-65235 | 3/2006 |
| JP | 3957430 | 8/2007 |
| JP | 2008-39892 | 2/2008 |
| JP | 2008-181139 | 8/2008 |
| JP | 2011-248132 | 12/2011 |
| JP | 2012-503219 | 2/2012 |
| KR | 10-2006-0051790 | 5/2006 |
| TW | 201207494 | 2/2012 |
| WO | WO 2012/043620 A1 | 4/2012 |

OTHER PUBLICATIONS

International Preliminary Report on Patentability mailed Nov. 27, 2014 in corresponding International Patent Application No. PCT/JP2013/062822.
Taiwanese Office Action dated Mar. 10, 2015 in corresponding Taiwanese Patent Application No. 102116877.
Korean Office Action dated Jan. 19, 2016 in corresponding Korean Patent Application No. 10-2014-7035338.
Chinese Office Action dated May 31, 2016 in corresponding Chinese Patent Application No. 201380025833.7.

* cited by examiner

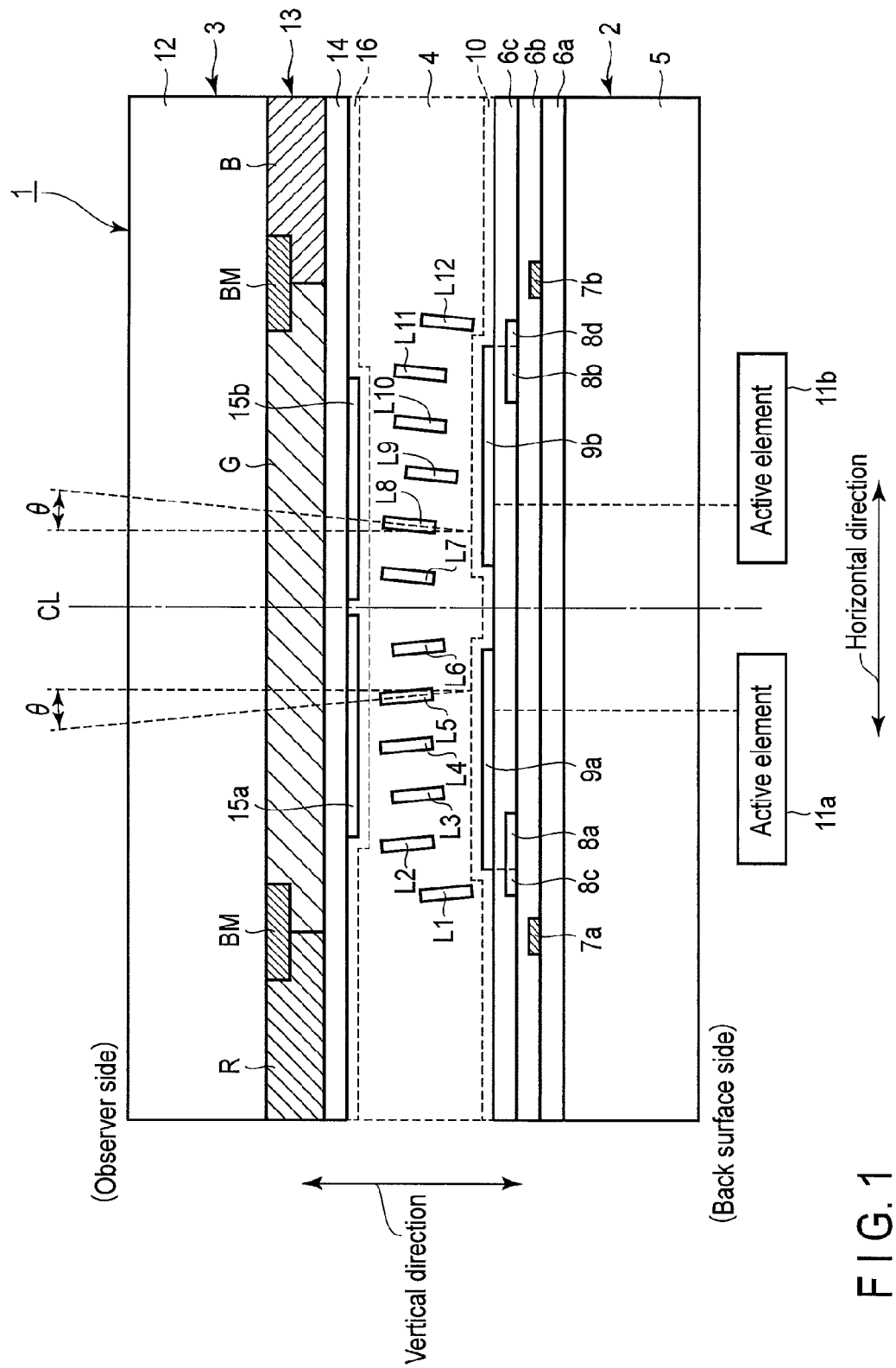
F I G. 1

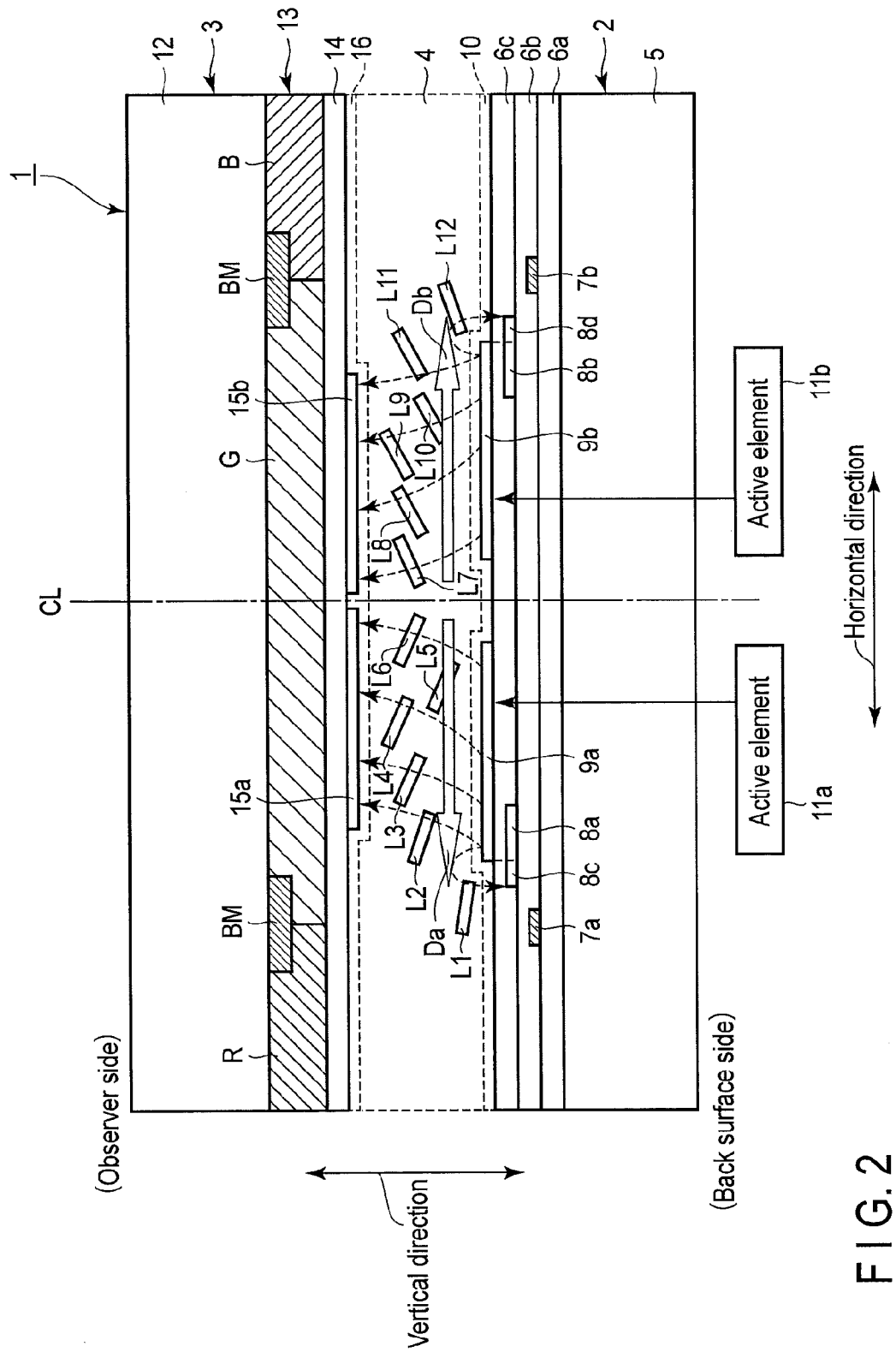
F I G. 2

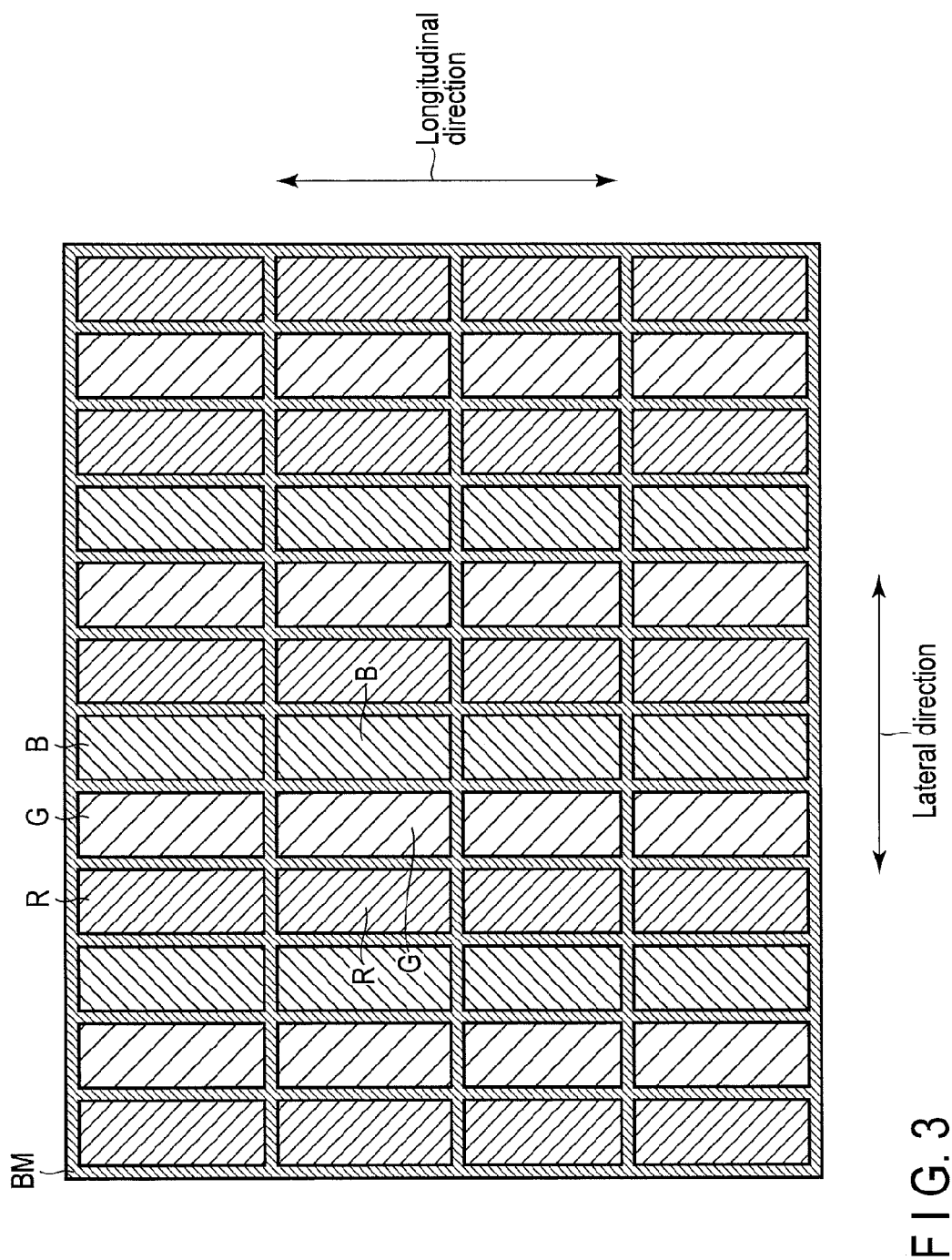
F I G. 3

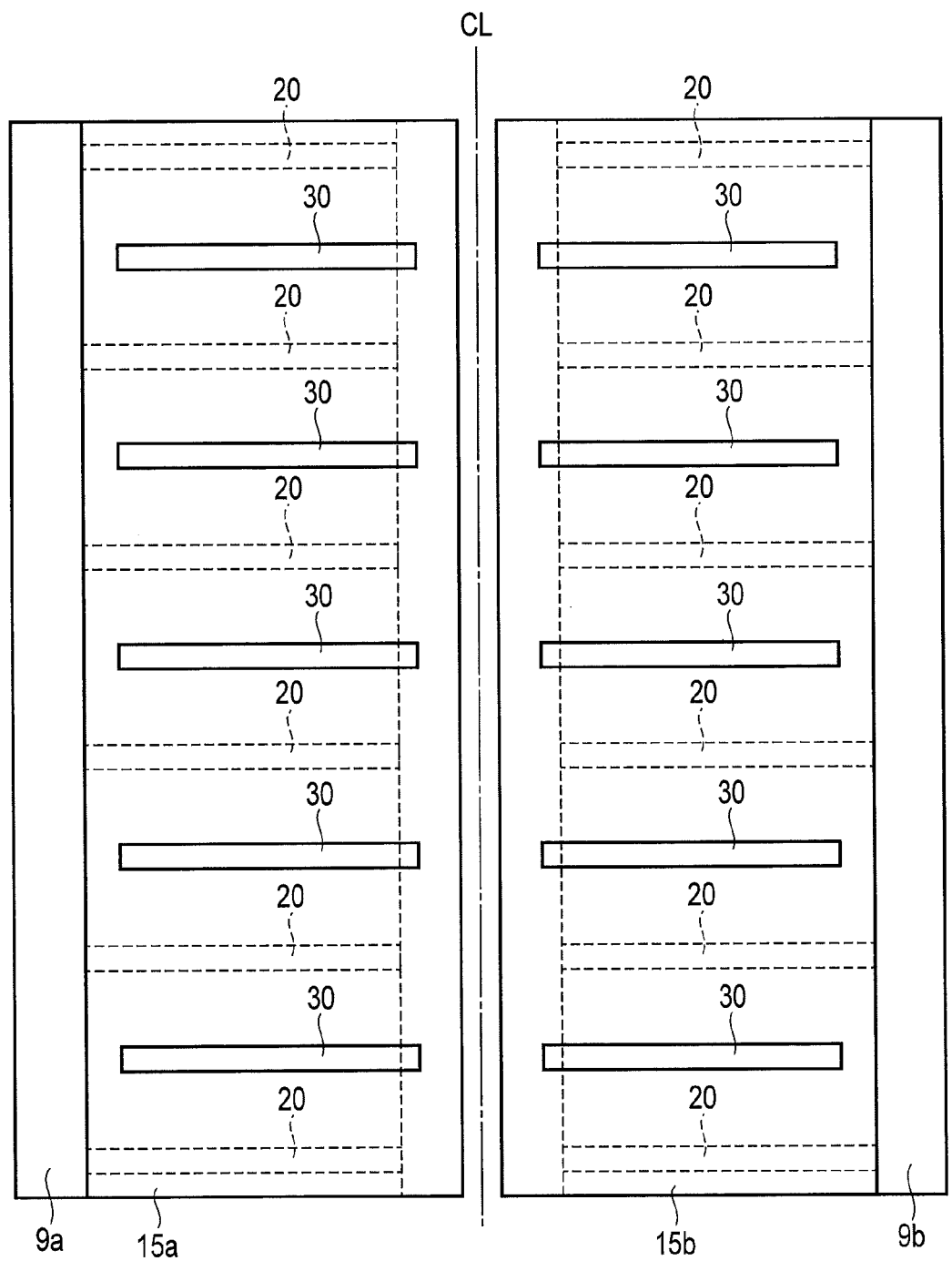
F I G. 10

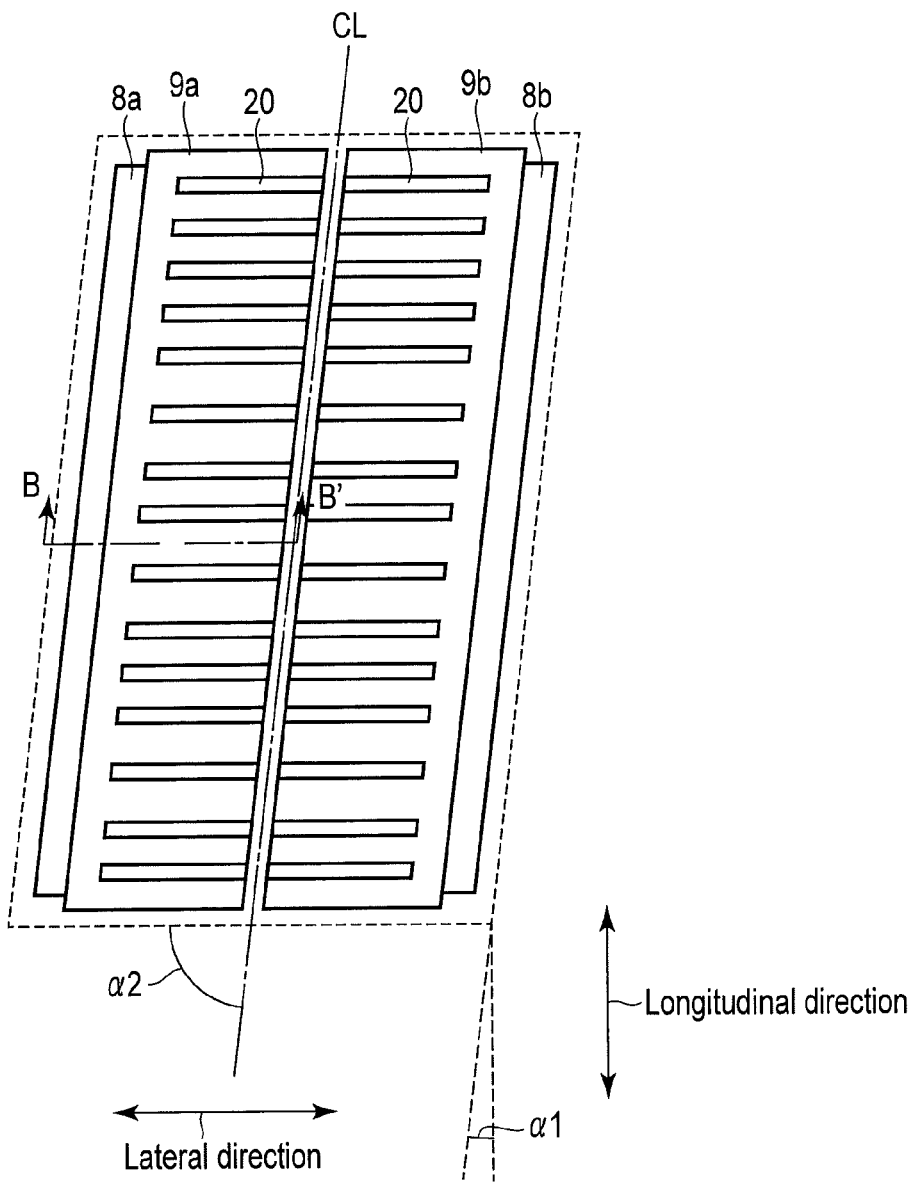
F I G. 13

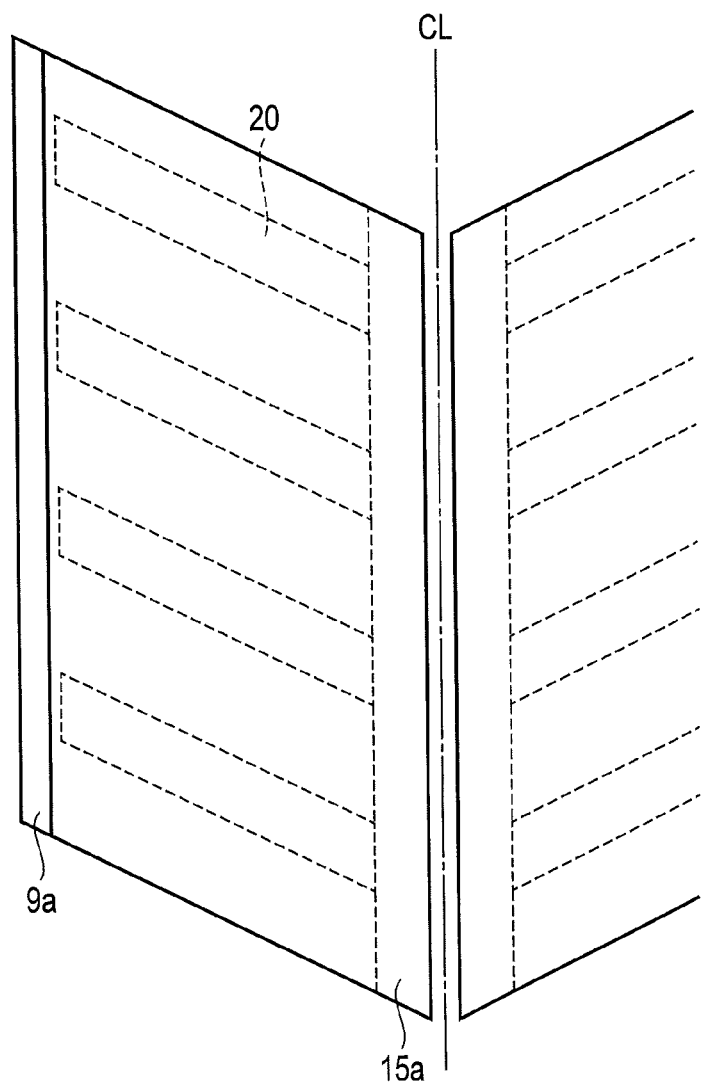
F I G. 16

LIQUID CRYSTAL DISPLAY DEVICE

CROSS-REFERENCE TO RELATED APPLICATIONS

This application is Continuation Application of PCT Application No. PCT/JP2013/062822, filed May 7, 2013 and based upon and claiming the benefit of priority from the Japanese Patent Application No. 2012-113299, filed May 17, 2012, the entire contents of all of which are incorporated herein by reference.

BACKGROUND OF THE INVENTION

1. Field of the Invention

The present invention relates to a liquid crystal display device.

2. Description of the Related Art

A liquid crystal display device is a kind of flat-panel display device. Higher image quality, lower cost, and power saving are requested of liquid crystal display devices. For example, higher image quality is implemented by improving the color filter of the liquid crystal display device. The image quality is improved by implementing, e.g., sufficient color purity, high contrast, and high flatness.

To improve the image quality of the liquid crystal display device, liquid crystal alignment methods or liquid crystal driving methods such as VA (Vertical Alignment), HAN (Hybrid-Aligned Nematic), TN (Twisted Nematic), OCB (Optically Compensated Bend), and CPA (Continuous Pinwheel Alignment) have been proposed. By putting these techniques into practical use, a wide viewing angle and quick response of the liquid crystal display device are implemented.

A VA liquid crystal display device in which liquid crystal is aligned parallel to the flat surface of a substrate such as glass implements a wide viewing angle and quick response. A HAN liquid crystal display device effectively implements a wide viewing angle. However, higher accuracy is requested of the VA liquid crystal display device or HAN liquid crystal display device in terms of the flatness (uniformity of the film thickness and reduction of unevenness of the color filter surface) for the color filter, and electrical characteristics such as the dielectric constant.

In a high-image-quality liquid crystal display device, a technique of decreasing the thickness of a liquid crystal layer (thickness of a liquid crystal cell) is important for a quick response.

For the VA method, various improved modes have been developed, including MVA (Multi-domain Vertically Alignment), PVA (Patterned Vertically Alignment), VAECB (Vertically Alignment Electrically Controlled Birefringence), VAHAN (Vertical Alignment Hybrid-Aligned Nematic), and VATN (Vertical Alignment Twisted Nematic).

A quicker liquid crystal response, wider viewing angle, and higher transmittance are required in a longitudinal electric field type liquid crystal display device in which a driving voltage is applied in the thickness direction of a liquid crystal layer, as in the VA method.

It is difficult to set the direction in which liquid crystal molecules lie, which is initially perpendicular to the substrate surface, upon applying a voltage]. In the MVA method, a plurality of slit-like projecting portions are arranged to prevent vertically aligned liquid crystal becoming unstable upon applying a liquid crystal driving voltage. In the MVA method, a wide viewing angle is ensured by forming a plurality of liquid crystal domains in different alignment directions between a plurality of slits.

Patent literature 1 (Japanese Patent No. 3957430) has disclosed a technique of forming a liquid crystal domain by using first and second alignment regulating structures (slits).

Patent literature 2 (Jpn. Pat. Appln. KOKAI Publication No. 2008-181139) has disclosed a technique of forming four liquid crystal domains by using photoalignment. In patent literature 2, alignment processing is required a plurality of (four) times to add a strict pretilt angle (89° with respect to the horizontal direction) to each liquid crystal domain, in order to ensure a wide viewing angle. Further, in patent literature 2, a plurality of alignment axes different from each other by 90° are necessary.

Patent literature 3 (Jpn. Pat. Appln. KOKAI Publication No. 2011-248132) has disclosed the electrode arrangement of an array substrate in which the second electrode protrudes from the first electrode.

As described above, in the vertically aligned MVA liquid crystal display device, a liquid crystal domain is formed using a plurality of slits formed on a color filter in order to ensure a wide viewing angle. The slit is formed on the liquid crystal layer side, compared to the color filter. Liquid crystal molecules positioned between two resin slits have a lengthwise direction perpendicular to the substrate surface before a driving voltage is applied. When the driving voltage is applied, the liquid crystal molecules between the two slits lie in a direction perpendicular to the two slits, and tilt to be parallel to the substrate surface. However, as for a central liquid crystal molecule between the two slits, the direction in which the central liquid crystal molecule lies upon applying a driving voltage is not uniquely determined, and splay alignment or bend alignment sometimes occurs. Such liquid crystal alignment disorder causes roughness of the liquid crystal display, display unevenness, and a decrease in transmittance.

In the MVA method, it is difficult to finely control, by the driving voltage, the amount in which the liquid crystal molecules lie. For this reason, the MVA liquid crystal display device is inferior in halftone display controllability to, e.g., a horizontally aligned liquid crystal display device called an IPS. Particularly, in the MVA method, the linearity between the driving voltage and the display (response speed) is poor, and halftone display at a low driving voltage is difficult.

The technique in patent literature 2 solves many problems of the MVA method as described above. However, the technique in patent literature 2 requires alignment processing involving a plurality of exposures. In patent literature 2, the alignment sometimes becomes slightly nonuniform in a domain formed to ensure a wide viewing angle, as shown in FIG. 61 of patent literature 2. Owing to this nonuniformity, unevenness readily occurs at the peripheral portion of a pixel.

FIG. 20 is a plan view showing an example of a conventional pixel electrode which improves the nonuniformity of the tilt in a domain. Source signal lines 7a and 7b are arranged at frame portions of a pixel (two lateral sides of a pixel) in the longitudinal direction. Gate lines 23a and 23b are arranged at frame portions of the pixel in the lateral direction.

FIG. 21 is a partial sectional view showing an example of the state of an electric line of force between the distal end of the pixel electrode and the source signal lines 7a and 7b. FIG. 21 shows a section taken along a line E-E' in FIG. 20. FIGS. 20 and 21 show the generation state of a dark portion 24 formed at the frame portion of the pixel.

In FIG. 20, a pixel electrode 25 having a comb tooth pattern in which the lengthwise directions of comb teeth extend in four directions is arranged to prevent the nonuniformity of alignment in the domain.

By the comb tooth-like pixel electrode 25, liquid crystal alignments in four domains can be changed to coincide with the lengthwise directions of the four comb teeth upon applying a liquid crystal driving voltage. Hence, a high liquid crystal image quality can be provided.

However, the distal end portion of the comb tooth-like pixel electrode 25 shown in FIG. 20 is readily influenced by the voltages of the source signal lines 7a and 7b arranged at frame portions of the pixel in the longitudinal direction. As the pixel size becomes smaller, the influence of wiring of thin film transistors (TFTs) such as the source signal lines 7a and 7b becomes more serious. Due to an electric field between the comb tooth-like pixel electrode 25 and the source signal lines 7a and 7b, a liquid crystal molecule 26 near a frame portion of the pixel in the longitudinal direction lies in a direction 29 different from the alignment in the lengthwise direction of the pixel electrode 25, and the dark portion 24 may be generated. The dark portion 24 may be ignored in a large liquid crystal display device with a large pixel size. However, in micropixels at 200 ppi (pixels per inch) or more, the area ratio of the dark portion 24 in the longitudinal direction to the pixel rises and may exert a non-negligible influence.

When the liquid crystal driving voltage is applied, liquid crystal molecules in the pixel lie in four directions 27a to 27d toward the center of the pixel which are lengthwise directions of the comb tooth-like pixel electrode 25, thereby implementing a wide-viewing-angle display. However, the liquid crystal molecules are influenced by the electric fields of the source signal lines 7a and 7b at the frame portions of the pixel. An electric field expressed by an electric line 28 of force is formed between the comb tooth-like pixel electrode 25 and each of the source signal lines 7a and 7b. By the electric line 28 of force, the liquid crystal molecule 26 near the frame portion lies in the direction 29 from the pixel electrode toward the source signal line 7a or 7b. The direction 29 in which the liquid crystal molecule 26 lies is different from a direction in which other main liquid crystal molecules lie. As a result, the light transmittance of the pixel near the frame portion becomes low, and the dark portions 24 are generated near the source signal lines 7a and 7b.

Patent literature 3 has disclosed a vertically aligned liquid crystal display device which executes symmetric liquid crystal operations to divide the pixel region into two when the driving voltage is applied between the first, second, and third electrodes, as disclosed in claim 9 of patent literature 3. An arrangement in which color filters of a plurality of colors are stacked on a transparent conductive film disclosed in claim 1 of patent literature 3 is advantageous in ensuring a high transmittance. However, when a color filter serving as a dielectric is stacked on the transparent conductive film, it sometimes has an extra electric capacitance. In a mobile device such as a tablet terminal or mobile phone, it is desirable to reduce power consumption and use the mobile device for a long time. It is therefore preferable for the liquid crystal display device not to have an extra electric capacitance. Further, patent literature 3 has not disclosed the surface of the first electrode for performing a more uniform liquid crystal operation at a higher speed. In addition, patent literature 3 has not disclosed the pretilt direction of an alignment film on the first electrode for performing a higher-speed liquid crystal operation. Patent literature 3 has not disclosed that a pretilt angle for a high-speed operation is given to an alignment film on the first electrode excluding the shoulder portion and recessed portion of the color filter.

BRIEF SUMMARY OF THE INVENTION

The present invention has been made in consideration of the above situation, and has as its object to provide a liquid crystal display device capable of tilting liquid crystal molecules with high accuracy and driving the liquid crystal at a high response speed.

Solution to Problem

A liquid crystal display device according to an aspect comprises an array substrate, color filter substrate, and liquid crystal layer. The array substrate includes a plurality of pixel electrodes and a plurality of common electrodes corresponding to a plurality of pixels arranged in a matrix, and an alignment film. The color filter substrate faces the array substrate, and includes a plurality of color filters and a plurality of counter electrodes corresponding to the plurality of pixels. The liquid crystal layer is interposed between the array substrate and the color filter substrate. The plurality of pixels have a polygonal shape longer in a longitudinal direction than in a lateral direction when viewed from the top. When viewed from the top, the pixel is line-symmetric with respect to a center line which is parallel to a lateral side of the polygonal shape and divides the pixel into two. The pixel electrode is divided line-symmetrically with respect to the center line when viewed from the top. At least one streak having a lengthwise direction toward the center line is formed on a surface of the pixel electrode on a side of the liquid crystal layer when viewed from the top. The common electrode is divided line-symmetrically with respect to the center line when viewed from the top. The common electrode is formed at a position distant from the liquid crystal layer, compared to the pixel electrode, in a vertical direction perpendicular to a substrate plane. A position of the common electrode in the lateral direction shifts in a direction apart from the center line with respect to the pixel electrode when viewed from the top. The liquid crystal layer includes a liquid crystal molecule having negative dielectric constant anisotropy. The alignment film gives a pretilt angle to the liquid crystal molecule to tilt a lengthwise direction of the liquid crystal molecule from the vertical direction in a direction in which the common electrode shifts from the pixel electrode.

Advantageous Effects of Invention

In the aspect of the present invention, the liquid crystal molecules of the liquid crystal display device can be tilted with high accuracy, and the liquid crystal can be driven at a high response speed.

BRIEF DESCRIPTION OF THE SEVERAL VIEWS OF THE DRAWINGS

FIG. 1 is a sectional view partially showing an example of a liquid crystal display device according to the first embodiment.

FIG. 2 is a sectional view partially showing an example of the state of the liquid crystal display device upon applying a liquid crystal driving voltage according to the first embodiment.

FIG. 3 is a plan view showing an example of the arrangement of red filters, green filters, and blue filters partitioned by a black matrix according to the first embodiment.

FIG. 10 is a plan view showing an example of counter electrodes and pixel electrodes arranged in a rectangular pixel.

FIG. 13 is a pixel plan view showing an example of the planar shapes of pixel electrodes and common electrodes according to the second embodiment.

FIG. 16 is a partial plan view showing an example of the arrangement positions of a counter electrode and pixel electrode according to the third embodiment.

DETAILED DESCRIPTION OF THE INVENTION

Figure 4:
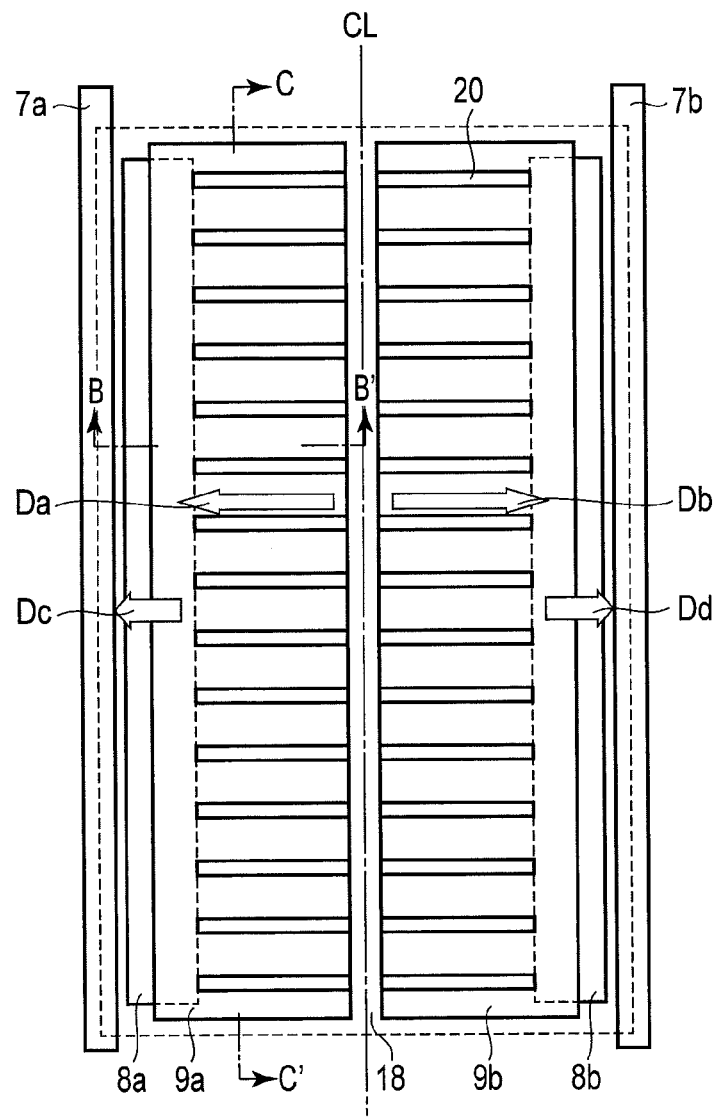
FIG. 4 is a pixel plan view showing an example of the planar shapes of pixel electrodes and common electrodes arranged on an array substrate.

Embodiments of the present invention will now be described with reference to the accompanying drawings. In the following description, the same reference numerals denote the same or substantially the same functions and building components, and will be explained, as needed.

In the following embodiments, only characteristic parts will be described, and a description of parts similar to the building components of a general liquid crystal display device will be omitted.

In the following embodiments, a pixel may be a sub-pixel. The display unit of the liquid crystal display device may be a picture element formed from at least one pixel or at least one sub-pixel. The number of pixels or sub-pixels included in a picture element can be freely changed.

In the following embodiments, a pixel arrangement direction almost parallel to the arrangement direction of the right and left eyes of an observer is defined as a lateral direction, and a pixel arrangement direction perpendicular to the lateral direction is defined as a longitudinal direction.

A colored pixel has a shape longer in the longitudinal direction than in the lateral direction. Hence, the lateral direction is the widthwise direction of the pixel, and the longitudinal direction is the lengthwise direction of the pixel.

In some cases, two pixels adjacent in the lateral or longitudinal direction will be explained as a pair of pixels.

[First Embodiment]

The first embodiment will explain a pixel shape and electrode shape for tilting liquid crystal molecules with high accuracy and increasing the liquid crystal driving speed.

FIG. 1 is a partial sectional view showing an example of a liquid crystal display device according to the first embodiment. FIG. 1 shows a section in the lateral direction.

A liquid crystal display device 1 includes, as basic building components, an array substrate 2, color filter substrate (or counter substrate) 3, and liquid crystal layer 4. The array substrate 2 and color filter substrate 3 face each other via the liquid crystal layer 4. In FIG. 1, the observer side of the liquid crystal display device 1 is the upper side, and the back surface side is the lower side.

In the first embodiment, a plurality of pixels have a polygonal shape longer in the longitudinal direction than in the lateral direction when viewed from the top. The pixel shape is line-symmetric with respect to a center line CL which is parallel to the lateral side of the polygonal shape and divides the pixel into two in the lateral direction.

The array substrate 2 has an arrangement in which an insulating layer 6a, source signal lines 7a and 7b, an insulating layer 6b, common electrodes (second electrodes) 8a and 8b, an insulating layer 6c, pixel electrodes (first electrodes) 9a and 9b, and an alignment film (alignment maintaining layer) 10 are formed sequentially on one surface of a transparent substrate 5. The common electrodes 8a and 8b and the pixel electrodes 9a and 9b are arranged in each pixel.

More specifically, the insulating layer 6a is formed on one surface of the transparent substrate 5. The source signal lines 7a and 7b are formed on the insulating layer 6a. The insulating layer 6b is formed on the insulating layer 6a on which the source signal lines 7a and 7b have been formed. The common electrodes 8a and 8b are formed on the insulating layer 6b. The insulating layer 6c is formed on the insulating layer 6b on which the common electrodes 8a and 8b have been formed. The pixel electrodes 9a and 9b are formed on the insulating layer 6c. The alignment film 10 is formed on the insulating layer 6c on which the pixel electrodes 9a and 9b have been formed.

The transparent substrate 5 of the array substrate 2 may be, e.g., a glass substrate. The array substrate 2 includes active elements 11a and 11b such as TFTs. Three-dimensional (stereoscopic) display becomes possible by arranging two active elements in each pixel unit. Note that the active elements 11a and 11b may be formed on the transparent substrate 5. When the liquid crystal display device 1 performs only two-dimensional display, one active element may be arranged in each pixel unit. In the case of only two-dimensional display, the liquid crystal driving voltage is applied to both the pixel electrodes 9a and 9b at the same timing. The other surface side of the transparent substrate of the array substrate 2 is the back surface side of the liquid crystal display device 1. The alignment film 10 of the array substrate 2 contacts the liquid crystal layer 4.

The source signal lines 7a and 7b are formed along frame portions of the pixel in the longitudinal direction.

The common electrodes 8a and 8b are divided line-symmetrically with respect to the center line CL when viewed from the top. The common electrodes 8a and 8b shift from the pixel electrodes 9a and 9b in directions to the lateral sides (frame portions in the longitudinal direction) of the pixel in the horizontal direction of the section of FIG. 1, and thus have protruding portions 8c and 8d. The common electrodes 9a and 9b may have a linear, band, plate, comb tooth, rectangular, parallelogramatic, or polygonal pixel shape.

The pixel electrodes 9a and 9b are divided line-symmetrically with respect to the center line CL when viewed from the top. The planar shape of the pixel electrodes 9a and 9b may be almost the same polygonal shape as that of the pixel opening region. The pixel electrodes 9a and 9b may fit in this pixel opening region when viewed from the top. Note that the pixel electrodes 9a and 9b may have a linear, band, plate, rectangular, parallelogramatic, or polygonal pixel shape.

The common electrodes 8a and 8b and the pixel electrodes 9a and 9b face each other via the insulating layer 6c in the vertical direction of the section of FIG. 1. The common electrodes 8a and 8b are formed at positions distant from the liquid crystal layer 4, compared to the pixel electrodes 9a and 9b, in a direction perpendicular to the substrate plane. Positions of the common electrodes 8a and 8b in the lateral direction shift from positions of the pixel electrodes 9a and 9b in the lateral direction when viewed from the top. The common electrodes 8a and 8b include portions protruding from the pixel electrodes 9a and 9b, and overlapping portions when viewed from the top. The potentials of the common electrodes 8a and 8b, and those of counter electrodes 15a and 15b (to be described later) may be the same common potential.

The pixel electrodes 9a and 9b are electrically connected to the active elements 11a and 11b. The pixel electrodes 9a and 9b may be formed by, for example, forming a linear slit at a pixel center portion parallel to the lateral side in one rectangular electrode. Slits at the pixel center portion according to the first embodiment are linear opening portions formed between the pixel electrodes 9a and 9b formed from a conductive film such as ITO, and between the counter electrodes 15a and 15b. The conductive film is removed from the slit at the pixel center portion.

For example, the common electrodes 8a and 8b and the pixel electrodes 9a and 9b are formed from a conductive metal oxide which is transparent in the visible wavelength region, such as the transparent conductive film (ITO). However, when the liquid crystal display device 1 is of a semi-transmissive type or reflective type, part or all of the common electrodes 8a and 8b and the pixel electrodes 9a and 9b may be formed from an aluminum alloy thin film or silver alloy thin film with high light reflectivity.

The alignment film 10 gives a pretilt angle θ to liquid crystal molecules L1 to L12 to tilt the lengthwise direction of the liquid crystal molecules L1 to L12 from the vertical direction to directions in which the common electrodes 8a and 8b shift from the pixel electrodes 9a and 9b. The alignment film 10 is formed between at least the surface of the pixel electrode 9b and the liquid crystal layer 4. The alignment film 10 tilts the liquid crystal molecules L1 to L12 of the liquid crystal layer 4 in the horizontal direction and in directions in which the common electrodes 8a and 8b protrude from the pixel electrodes 9a and 9b (directions from the center line CL of the pixel in the longitudinal direction toward frame portions of the pixel in the longitudinal direction).

The liquid crystal layer 4 contains the liquid crystal molecules L1 to L12 having negative dielectric constant anisotropy. For example, the liquid crystal molecules L1 to L12 are aligned vertically. In FIG. 1, the liquid crystal molecules L1 to L12 represent an initial alignment state in which no voltage is applied to the common electrodes 8a and 8b.

The color filter substrate 3 has an arrangement in which a black matrix BM, a color filter layer 13, a transparent resin layer 14, the counter electrodes (third electrodes) 15a and 15b, and an alignment film 16 are formed sequentially on one surface of a transparent substrate 12. One of a red filter R, green filter G, and blue filter B included in the color filter layer 13, and the counter electrodes 15a and 15b are arranged for each pixel.

More specifically, the black matrix BM is formed on one surface of the transparent substrate 12. The color filter layer 13 is formed on the transparent substrate 12 on which the black matrix BM has been formed. The transparent resin layer 14 is formed on the color filter layer 13. The counter electrodes 15a and 15b are formed on the transparent resin layer 14. The alignment film 16 is formed on the transparent resin layer 14 on which the counter electrodes 15a and 15b have been formed.

The other surface side of the transparent substrate 12 of the color filter substrate 3 is the observer side of the liquid crystal display device 1. The alignment film 16 of the color filter substrate 3 contacts the liquid crystal layer 4.

The transparent substrate 12 of the color filter substrate 3 may be, e.g., a glass substrate.

The black matrix BM partitions one surface of the transparent substrate 12 into a plurality of pixel opening regions (pixel regions or sub-pixel regions). Hence, the black matrix BM is formed at the frame portions of pixels. The black matrix BM may be included in the color filter layer 13.

In the first embodiment, the planar shape of the pixel opening region is, e.g., a polygonal shape whose opposing sides are parallel. This polygonal shape may be, e.g., a square, a rectangle, a parallelogram, a bent "<" shape (boomerang shape), a "V" shape, or a hexagon. Each pixel opening region corresponds to each pixel.

The black matrix BM is a light-shielding layer formed at the frame portions of a unit pixel or sub-pixel or on two or four opposing sides of a unit pixel or sub-pixel in order to improve the contrast of the liquid crystal display. The light-shielding layer is formed from, e.g., a coating film in which a light-shielding pigment is dispersed in a transparent resin. The light-shielding layer generally has photosensitivity. The light-shielding layer is formed by pattern formation of a light-shielding coating film by photolithography including exposure and development.

The color filter layer 13 assigns one of the red filter R, blue filter B, and green filter G to each pixel.

As the counter electrodes 15a and 15b, for example, a transparent conductive film is used. The planar shape of the counter electrodes 15a and 15b may be almost the same polygonal shape as that of the pixel opening region. For example, the counter electrodes 15a and 15b may have a linear, band, plate, comb tooth, rectangular, parallelogramatic, or polygonal pixel shape. In the horizontal direction of the section of FIG. 1, positions of the counter electrodes 15a and 15b in the lateral direction shift from positions of the pixel electrodes 9a and 9b in the lateral direction. For example, the directions in which the counter electrodes 15a and 15b shift from the pixel electrodes 9a and 9b may be opposite to the directions in which the common electrodes 8a and 8b shift from the pixel electrodes 9a and 9b. In the first embodiment, the counter electrodes 15a and 15b shift toward the center line CL of the pixel in the longitudinal direction, compared to the pixel electrodes 9a and 9b. In the vertical direction of the section of FIG. 1, the counter electrodes 15a and 15b face the pixel electrodes 9a and 9b via the alignment film 16, liquid crystal layer 4, and alignment film 10. The counter electrodes 15a and 15b include portions protruding from the pixel electrodes 9a and 9b, and overlapping portions when viewed from the top. When the liquid crystal is driven, a voltage is applied between the counter electrodes 15a and 15b and the pixel electrodes 9a and 9b to generate an oblique electric field.

The counter electrodes 15a and 15b may be formed by forming a slit at the pixel center portion of one rectangular electrode in the longitudinal direction.

For example, the counter electrodes 15a and 15b are formed from a conductive metal oxide which is transparent in the visible wavelength region, such as a transparent conductive film.

The alignment film 16 is formed between at least the surfaces of the counter electrodes 15a and 15b, and the liquid crystal layer 4. The alignment film 16 may or may not give a pretilt angle to the liquid crystal layer 4. For example, the alignment film 16 may tilt the liquid crystal molecules of the liquid crystal layer 4 in the horizontal direction and in directions from the center line CL of the pixel in the longitudinal direction toward frame portions of the pixel in the longitudinal direction. Alternatively, the alignment film 16 may maintain the vertical alignment of the liquid crystal molecules without performing alignment processing on the alignment film 16 or giving a pretilt angle to the liquid crystal molecules by the alignment film 16. The magnitude of the pretilt angle of the liquid crystal molecules that is given by the alignment film 16 may be different from the magnitude of the pretilt angle of the liquid crystal molecules that is given by the alignment film 10. In the first embodiment, the normal direction (vertical direction in FIG. 1) of the substrate surface is defined as 0°, and the pretilt angle θ represents an angle from this normal direction. For vertical alignment, the pretilt angle is 0°.

For example, the pretilt angle θ of the liquid crystal molecules by the alignment film 16 may range from about 0° to 1.0° with respect to the vertical direction, and the pretilt angle θ of the liquid crystal molecules by the alignment film 10 may range from about 0.1° to 1.5°. For example, the pretilt angle θ of the liquid crystal molecules on the pixel electrodes 9a and 9b may range from about 0.3° to 1.0°. The pretilt angle θ of the liquid crystal molecules can implement line-symmetric tilts with respect to the center line parallel to the lateral side of the pixel.

In alignment processing on the alignment films 10 and 16, photoalignment may be performed from a plurality of directions before the formation of a liquid crystal cell. Alternatively, in alignment processing on the alignment films 10 and 16, mask rubbing processing may be performed a plurality of times on the alignment films 10 and 16. As a result, a plurality of domains having a plurality of alignment directions may be formed in the pixel.

In alignment processing performed on the alignment films 10 and 16, it is also possible to apply a voltage to the pixel electrodes 9a and 9b and perform light irradiation after the formation of a liquid crystal cell. This alignment processing is simple and suffices to be executed once. By performing alignment processing without polarization, the exposure amount can be substantially increased to shorten the processing time.

In the first embodiment, it is only necessary to give the small pretilt angle θ to the vertically aligned liquid crystal molecules L1 to L12, so the time of alignment processing such as light irradiation can be shortened.

The alignment films 10 and 16 may have a film thickness of, e.g., about 60 nm. The alignment films 10 and 16 are formed on surfaces of the array substrate 2 and color filter substrate 3 that contact the liquid crystal layer 4.

In the liquid crystal display device 1 according to the first embodiment, a liquid crystal cell is formed by combining, e.g., the array substrate 2, color filter substrate 3, and liquid crystal layer 4. In alignment processing, the liquid crystal driving voltage (e.g., an AC or DC voltage of 1 V to 20 V) is applied to the pixel electrodes 9a and 9b, the vertically aligned alignment films 10 and 16 are irradiated with electromagnetic waves such as light, and the pretilt angle θ is given. Irradiation light in alignment processing may be polarized light or unpolarized light.

The common electrodes 8a and 8b are parallel to portions of the black matrix BM in the longitudinal direction when viewed from the top. In each pixel, the common electrodes 8a and 8b include the protruding portions 8c and 8d which protrude from the pixel electrodes 9a and 9b when viewed from the top. As shown in the section of FIG. 1, the pixel electrodes 9a and 9b and the counter electrodes 15a and 15b are shifted obliquely.

The liquid crystal display device 1 includes a polarizing plate, phase difference plate, and the like, similarly to a normal liquid crystal display device, but these components are not illustrated in FIG. 1. Note that the liquid crystal display device 1 may include one to three phase difference plates each obtained by bonding polarizing plates.

FIG. 2 is a partial sectional view showing an example of the state of the liquid crystal display device 1 upon applying a liquid crystal driving voltage according to the first embodiment.

The tilt directions of the liquid crystal molecules L1 to L12 upon applying a voltage between the pixel electrodes 9a and 9b and the common electrodes 8a and 8b, and between the pixel electrodes 9a and 9b and the counter electrodes 15a and 15b can be set by adjusting shifts between the pixel electrodes 9a and 9b and the common electrodes 8a and 8b at positions in the horizontal direction, and shifts between the pixel electrodes 9a and 9b and the counter electrodes 15a and 15b. In the section of FIG. 2, tilt directions Da and Db of the liquid crystal molecules L1 to L12 are horizontal directions from the center line CL of the pixel toward the lateral side portions. The tilt directions Da and Db are line-symmetric with respect to the center line CL of the pixel.

FIG. 3 is a plan view showing an example of the arrangement of the red filters R, green filters G, and blue filters B partitioned by the black matrix BM according to the first embodiment. In the first embodiment, different colors are arranged in the lateral direction, and the same color is arranged in the longitudinal direction. Note that pixels of the same color may be arranged in an oblique direction when viewed from the top.

FIG. 4 is a pixel plan view showing an example of the planar shapes of the pixel electrodes 9a and 9b and the common electrodes 8a and 8b arranged on the array substrate 2.

Figure 5:
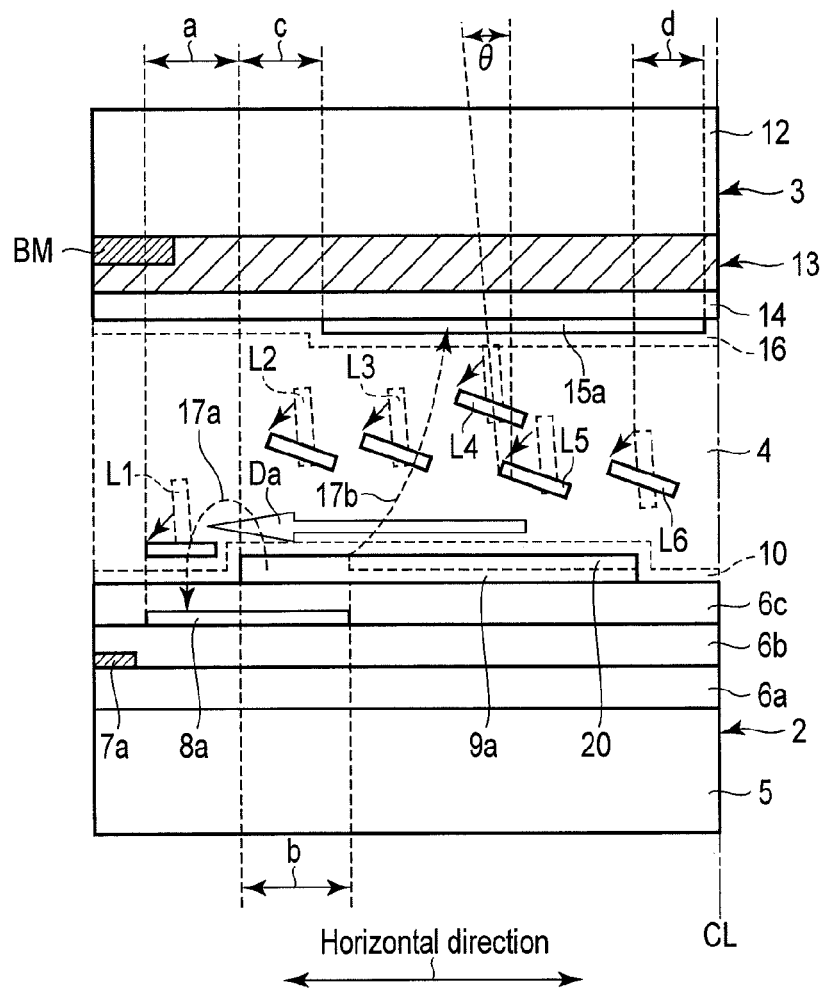
FIG. 5 is a sectional view partially showing an example of the left half of a pixel in the lateral direction according to the first embodiment.

FIG. 5 is a partial sectional view showing an example of the left half of the pixel in the lateral direction according to the first embodiment. FIG. 5 is equivalent to the left half of FIG. 2 described above, and shows a section taken along a line B-B' in FIG. 4.

As shown in FIG. 5, the liquid crystal molecules L1 to L6 when no liquid crystal driving voltage is applied to the pixel electrodes 9a and 9b are vertically aligned at a small pretilt angle $\theta$, as indicated by a broken line. When the liquid crystal driving voltage is applied to the pixel electrodes 9a and 9b, an electric field expressed by an electric line 17a of force is formed between the pixel electrode 9a and the common electrode 8a. Further, when the liquid crystal driving voltage is applied to the pixel electrode 9a, an electric field expressed by an oblique electric line 17b of force is formed between the pixel electrode 9a, and the counter electrode 15a at a position shifted from the formation position of the pixel electrode 9a.

The liquid crystal molecules L1, L2, and L6 tilt in the operating direction Da shown in FIG. 5 based on the oblique electric field.

Immediately after the initial tilts of the liquid crystal molecules L1, L2, and L6 propagate to the liquid crystal molecules L3 to L5 upon applying a driving voltage, the liquid crystal molecules L3 to L5 lie in the operating direction Da.

The liquid crystal molecules L7 to L12 of the pixel on the right half shown in FIG. 2 tilt in the direction Db opposite to Da. The liquid crystal molecules L1 and L12 in an effectively strong electric field operate earliest, and serve as a trigger for speeding up the liquid crystal display. Even the liquid crystal molecules L2 to L6 and L7 to L11 in an oblique electric field operate at a high speed, similarly to the liquid crystal molecules L1 and L12. Accordingly, the liquid crystal molecules L2 to L6 and L7 to L11 implement high-speed liquid crystal display in cooperation with the liquid crystal molecules L1 and L12.

By tilting the liquid crystal molecules L1 to L12 by an oblique electric field, as in the first embodiment, even a liquid crystal molecule having a small pretilt angle $\theta$ can be driven similarly to a liquid crystal molecule having a substantially large pretilt angle. High-speed liquid crystal display can therefore be implemented by tilting the liquid crystal molecules L1 to L12 by an oblique electric field. For example, by tilting the liquid crystal molecules L1 to L12 by an oblique electric field, the liquid crystal molecules L1 to L12 can be operated quickly even at a small pretilt angle $\theta$ of about 0.1° to 0.9°. In vertically aligned liquid crystal display, It is easy that a liquid crystal molecule having a large pretilt angle lies. However, owing to the large pretilt angle, light leaks even in black display, and the contrast may drop.

In the liquid crystal display device 1, electric fields from the pixel electrodes 9a and 9b to protruding portions a (corresponding to the protruding portions 8c and 8d) of the common electrodes 8a and 8b are formed at end portions of the pixel near facing lateral sides in the longitudinal direction, thereby tilting the liquid crystal molecules in the protruding directions Da and Db. The formation of an electric field, and the liquid crystal operation according to the first embodiment can cancel dark portions 24 near two sides in the longitudinal direction, which have been a problem in a conventional vertically aligned liquid crystal display device, and can implement uniform display in the pixel at a high transmittance.

As shown in FIG. 4, the overall size of the pixel electrodes 9a and 9b is slightly smaller than or almost equal to the pixel opening region of the black matrix BM of the polygonal pixel. The pixel electrodes 9a and 9b have almost the same shape (for example, a vertically long rectangle) of the pixel opening region.

A slit 18 is formed at a center portion in the longitudinal direction between the paired pixel electrodes 9a and 9b.

In the first embodiment, the size of the pixel opening region is almost the same as the size of each of the red filter R, green filter G, and blue filter B.

The source signal lines 7a and 7b are arranged near the lateral side portions of the pixel in the longitudinal direction.

At least one streak 20 having a lengthwise direction toward the center line CL is formed on a surface (surface on the observer side) of each of the pixel electrodes 9a and 9b on the liquid crystal layer 4 side when viewed from the top. For example, the angle between the lengthwise direction of the streak 20 and the lateral direction may range from 0°±45°. In the example of FIG. 4, at least one streak 20 extending in the direction (direction toward the lateral side of the pixel in this example) Dc or Dd in which the common electrode 8a or 8b protrudes from the pixel electrode 9a or 9b is formed on the surface of the pixel electrode 9a or 9b on the liquid crystal layer 4 side. The streaks 20 formed on the surfaces of the pixel electrodes 9a and 9b assist in making the tilt of the liquid crystal molecules L1 to L12 in the directions Da and Db uniform upon applying a driving voltage. At the same time, the streaks 20 improve the response characteristic of the liquid crystal. By forming at least one streak 20, the transmittance upon applying a driving voltage can be increased, and the transmittance distribution in the pixel can be uniformed.

As shown in FIG. 4, the streaks 20 are formed on the surfaces of the pixel electrodes 9a and 9b with a width of, e.g., about 2 µm, or 1 µm or smaller.

When the streaks 20 are formed on the surfaces of the pixel electrodes 9a and 9b, a texture based on the streaks 20 is generated in the alignment film 10 formed on the pixel electrodes 9a and 9b. For example, a texture of the streaks 20 is formed on the surface of the alignment film 10 by forming an alignment film 10 as thin as about 50 nm on the pixel electrodes 9a and 9b.

For example, the pixel electrodes 9a and 9b are formed from a transparent conductive film. The pixel electrodes 9a and 9b may have a thickness of about 150 nm. The streak 20 may be formed linearly at a depth of about 20 nm to 40 nm and a width of about 1 µm on the surface of the transparent conductive film. The streak 20 is formed by, e.g., slight etching. By slight etching, a streak 20 having a depth of about 20 nm to 40 nm may be formed, or a streak 20 having a depth of about 50 nm or more may be formed. At portions of the pixel electrodes 9a and 9b that do not overlap the common electrodes 8a and 8b in a plan view such as FIG. 4, the streaks 20 may be formed at a depth almost equal to the thickness of the pixel electrodes 9a and 9b. In the section, the streak 20 may be tapered. The width of the bottom of the streak 20 formed by etching or the like may be larger than about 2 µm. The pitch in the longitudinal direction serving as an interval for forming the streak 20 is preferably about 2 µm to 5 µm in order to make the tilts of the liquid crystal molecules L1 to L12 uniform. If the pitch of the streak 20 or the width of the bottom of the streak 20 is larger than 10 µm, this weakens the effect of uniformly tilting the liquid crystal molecules L1 to L12.

When oblique electric fields are formed between the pixel electrodes 9a and 9b and the counter electrodes 15a and 15b, the liquid crystal molecules can uniformly lie on the pixel electrodes 9a and 9b by a plurality of streaks 20 which are arrayed in the longitudinal direction and are long in the lateral direction. For example, when the streaks 20 are not formed on the pixel electrodes 9a and 9b, the liquid crystal molecules "nonuniformly lie" between the corner portions and center portions of the pixel electrodes 9a and 9b when viewed from the top, and the transmittance readily becomes different or uneven on the pixel electrodes 9a and 9b or in the pixel. Such difference or unevenness decreases the transmittance of the pixel. However, by forming the streaks 20 on the pixel electrodes 9a and 9b, as in the first embodiment, the liquid crystal molecules L1 to L12 can be uniformly tilted, preventing the generation of the difference and unevenness. Further, liquid crystal molecules above the streaks 20 are vertically aligned. The vertically aligned liquid crystal molecules above the streaks 20 are influenced by the texture appearing in the alignment film 10, and can be tilted at a low voltage. In the first embodiment, therefore, the liquid crystal molecules L1 to L12 can be driven at a high speed. Note that the number of streaks 20 can be adjusted based on the width and pitch of the streak 20 and the sizes of the pixel electrodes 9a and 9b.

At a position in the horizontal direction of FIG. 5, the pixel electrode 9a and common electrode 8a face each other in the vertical direction. The pixel electrode 9a and counter electrode 15a face each other in the vertical direction. The common electrode 8a shifts from the pixel electrode 9a toward the lateral side of the pixel. The common electrode 8a has the protruding portion a in correspondence with the shift of the common electrode 8a from the pixel electrode 9a. The protrusion amount (width in the horizontal direction) of the protruding portion a may be as small as, e.g., about 1 µm to 6 µm. The protrusion amount of the protruding portion a can be appropriately adjusted in accordance with the liquid crystal material, the driving conditions, the thickness of the liquid crystal layer 4, and the like. An overlapping portion b between the pixel electrode 9a and the common electrode 8a in the horizontal direction may be used for an auxiliary capacitance regarding liquid crystal driving. At a position in the horizontal direction of FIG. 5, the pixel electrode 9a shifts from the counter electrode 15a toward the lateral side of the pixel. The pixel electrode 9a has a protruding portion c in accordance with the shift of the pixel electrode 9a from the counter electrode 15a. The counter electrode 15a shifts from the pixel electrode 9a toward the center line CL of the pixel. The counter electrode 15a has a protruding portion d in accordance with the shift of the counter electrode 15a from the pixel electrode 9a. The protrusion amounts of the protruding portions c and d may be as small as, e.g., about 0.5 µm to 5 µm. Although FIG. 5 shows the section of the left half of the pixel, the section of the right half is line-symmetric to the left half.

Figure 6:
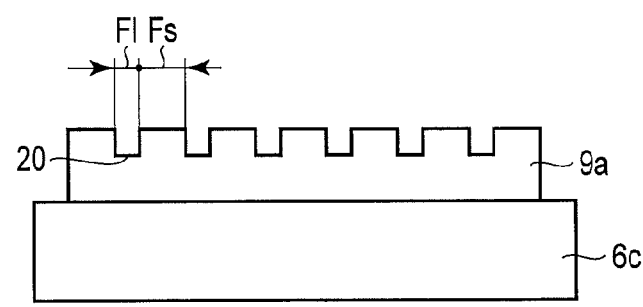
FIG. 6 is a sectional view showing the first example of streaks forming method.
Figure 7:
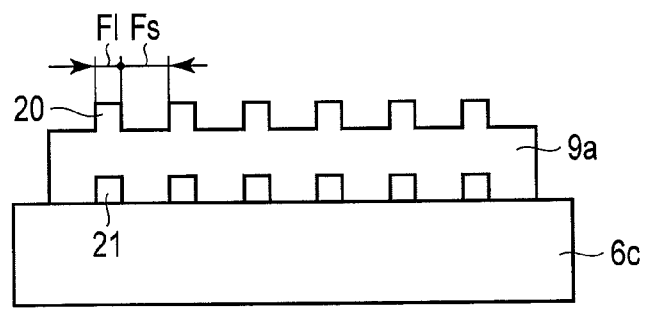
FIG. 7 is a sectional view showing the second example of the streaks forming method.
Figure 8:
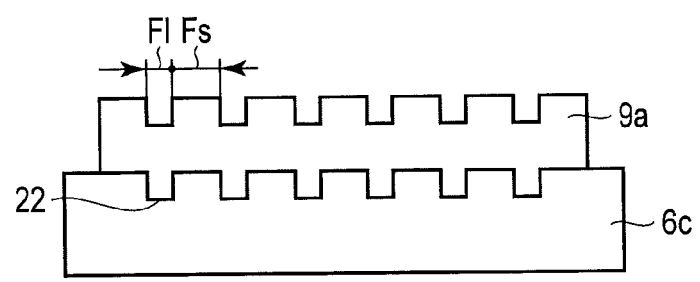
FIG. 8 is a sectional view showing the third example of the streaks forming method.

FIGS. 6, 7, and 8 are sectional views showing the first to third examples of a method of forming the streak 20. FIGS. 6, 7, and 8 correspond to a section taken along a line C-C' in FIG. 4. In the first embodiment, the formation density of the streaks 20, a width Fl, and a pitch Fs can be adjusted within the pixel.

In FIG. 6, the pixel electrode 9a is formed on the insulating layer 6c, and the streaks 20 are formed on the pixel electrode 9a by using a method such as etching.

In FIG. 7, projecting portions 21 are formed from a transparent resin or the like on the surface of the insulating layer 6c. The pixel electrode 9a is stacked on the insulating layer 6c on which the projecting portions 21 have been formed, thereby forming projecting streaks 20 on the pixel electrode 9a. The height of the projecting streak 20 is preferably designed to be, e.g., 200 nm or smaller so that the pretilt angle of liquid crystal molecules near the streaks 20 does not increase.

In FIG. 8, recessed portions 22 are formed in the surface of the insulating layer 6c by dry etching or the like, and the pixel electrode 9a is stacked on the insulating layer 6c in which the recessed portions 22 have been formed.

In the first embodiment, the pixel may be divided into four quadrants: an upper right region, upper left region, lower left region, and lower right region. The lengthwise direction of the streak 20 may be changed between these four quadrants. For example, the lengthwise direction of the streak may differ by about 90° between the four quadrants.

Two pixels adjacent in the lateral direction may be defined as a pixel unit, the pixel unit may be divided into four quadrants, and the lengthwise direction of the streak may be changed between these four quadrants.

Figure 9:
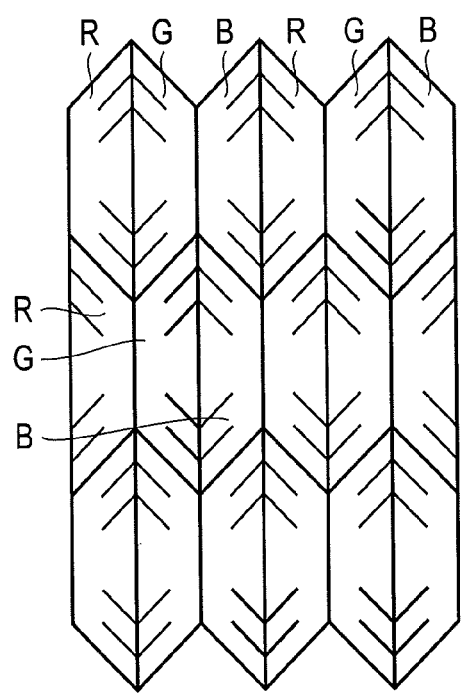
FIG. 9 is a plan view showing an example of a plurality of trapezoidal pixels.

FIGS. 3 and 4 exemplify a case in which the pixel has a rectangular shape longer in the longitudinal direction than in the lateral direction. However, the pixel may have, e.g., a trapezoidal shape in which a short side and long side are parallel to each other in the longitudinal direction, as shown in FIG. 9. The angle between the lengthwise direction of the streak and the lateral direction may range from about 0°±45°. In FIG. 9, the pixel unit includes two trapezoidal pixels arranged in the lateral direction. The pixel unit is line-symmetric with respect to a center line in the longitudinal direction between the two trapezoidal pixels. Pixels of the same color may be arranged in the longitudinal direction or lateral direction.

Figure 11:
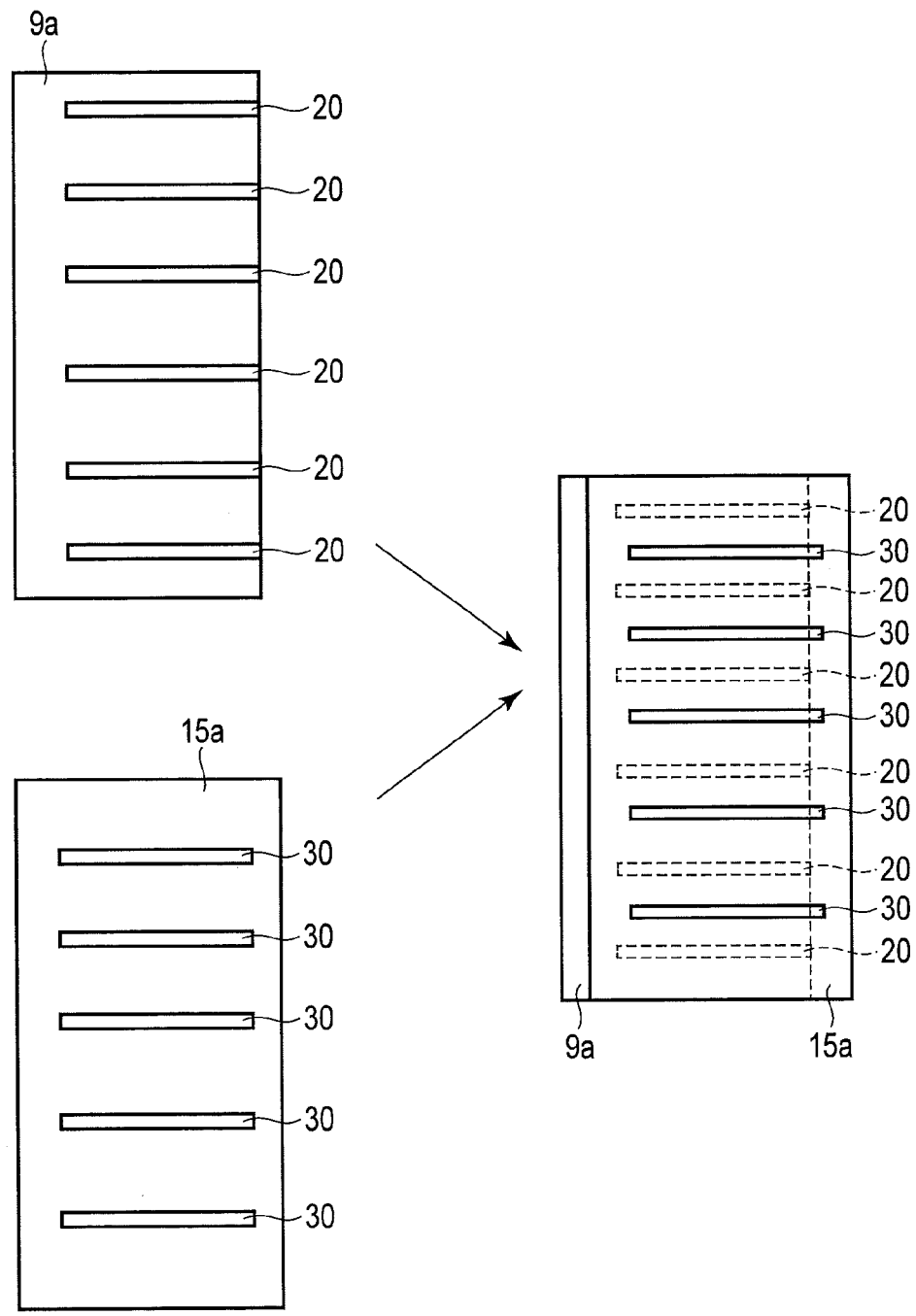
FIG. 11 is a plan view showing an example of the left half of the counter electrode and pixel electrode.

In the first embodiment, for example, as shown in FIGS. 10 and 11, the counter electrodes 15a and 15b may be formed in a rectangular pattern having slits 30 parallel to the plurality of streaks 20 formed on the surfaces of the pixel electrodes 9a and 9b. The tilt direction of the liquid crystal upon applying a driving voltage can be set to be parallel to the streaks 20 by making the lengthwise direction of the streaks 20 of the pixel electrodes 9a and 9b parallel to the lengthwise direction of the slits 30 of the counter electrodes 15a and 15b. Note that the positions of the streaks 20 of the pixel electrodes 9a and 9b can be center positions between the slits 30 formed in the counter electrodes 15a and 15b when viewed from the top. Assume that the slits 30 are linear openings formed in the counter electrodes 15a and 15b. The conductive film is removed in the slits 30. In the first embodiment, the slits 30 need not be formed in the counter electrodes 15a and 15b, and the counter electrodes 15a and 15b may have a simple rectangular pattern.

The first embodiment assumes that the liquid crystal molecules L1 to L12 of the liquid crystal layer 4 have negative dielectric constant anisotropy. As the liquid crystal molecules L1 to L12 of the liquid crystal layer 4, nematic liquid crystal molecules having a birefringence of about 0.06 to 0.3 at around room temperature can be used.

The thickness of the liquid crystal layer 4 is not particularly limited. For example, Δnd of the liquid crystal layer 4 effectively used in the first embodiment ranges from about 300 nm to 500 nm.

As the alignment films 10 and 16 before alignment processing, a substance containing photosensitive polyorganosiloxane, or a polymer of photosensitive polyorganosiloxane and polyamic acid or polyimide may be used. As the alignment films 10 and 16 before alignment processing, a siloxane-based polymer typified by siloxane cinnamate may be used. As the alignment films 10 and 16 before alignment processing, for example, a coating film such as photosensitive polyimide or a photosensitive polymer liquid crystal material may be used. As the alignment films 10 and 16 before alignment processing, for example, a photoalignment film using an azobenzene derivative, or a photoalignment film containing polyamic acid having a triple bond as a main chain may be used.

Note that the pretilt angle θ can be measured by, e.g., a crystal rotation method described in, e.g., Journal of Applied Physics, Vol. 48, No. 5, pp. 1783-1792 (1977).

The channels of TFTs used as the active elements 11a and 11b are formed from, e.g., a mixed metal oxide which is transparent in the visible range. The line width of the pattern of a light-shielding layer such as the black matrix BM can be decreased by forming the channels of the active elements 11a and 11b from an oxide semiconductor using a mixed metal oxide. By thinning the pattern of the light-shielding layer, the brightness of the liquid crystal display device 1 can be increased.

In the first embodiment, for example, an oxide semiconductor TFT may be used to efficiently perform photoalignment and improve the reliability of the liquid crystal display device 1. A conventional photoalignment technique is an alignment method using a photopolymerizable monomer-added liquid crystal. This alignment method may impair the reliability of the liquid crystal display device owing to the survival of an unpolymerized monomer generated by an insufficiently cured alignment film, or shielding of ultraviolet light by a TFT light-shielding portion occupying a large area regarding a silicon semiconductor, the black matrix BM, the color filter layer 13 with a low ultraviolet light transmittance, or the like. To the contrary, in the liquid crystal display device 1 according to the first embodiment, the area of the light-shielding portion is decreased to perform exposure in a wide area, the photopolymerizable monomer is not used, and thus the reliability and display quality can be greatly improved. Compared to such an oxide semiconductor TFT, a silicon semiconductor TFT is sensitive to visible light. For this reason, the silicon semiconductor TFT needs to be shielded from light by using a large light-shielding layer such as the black matrix BM. In the first embodiment, the active elements 11a and 11b are oxide semiconductor TFTs using a mixed metal oxide as a transparent channel material. The sensitivity of the oxide semiconductor TFT in the visible range is low. Thus, in the first embodiment, a large light-shielding portion as in the silicon semiconductor TFT need not be formed, and brighter display can be obtained.

As the oxide semiconductor, a composite oxide of a metal which is transparent in the visible range is applicable. A semiconductor material containing a metal oxide as a component may be a mixed metal oxide containing two or more elements selected from the group consisting of zinc, indium, tin, tungsten, magnesium, and gallium. Other examples of the semiconductor material containing a metal oxide as a component are zinc oxide, indium oxide, indium zinc oxide, tin oxide, tungsten oxide (WO), indium gallium zinc oxide (In—Ga—Zn—O), indium gallium oxide (In—Ga—O), zinc tin oxide (Zn—Sn—O), and zinc tin silicon oxide (Zn—Sn—Si—O). As the semiconductor material containing a metal oxide as a component, another material may be used. The semiconductor material used in the first embodiment is substantially transparent, and the band gap is preferably 2.8 eV or more, and more preferably 3.2 eV or more.

The structure of the semiconductor material used in the first embodiment is arbitrarily a single crystal, polycrystal, fine crystal, crystal/amorphous mixed crystal, nanocrystal-scattered amorphous, or amorphous. The film thickness of the oxide semiconductor is desirably about 10 nm or more.

The film or layer of the oxide semiconductor is formed using a method such as sputtering, pulse laser deposition, vacuum vapor deposition, CVD (Chemical Vapor Deposition), MBE (Molecular Beam Epitaxy), an inkjet method, or a printing method.

The film or layer of the oxide semiconductor is preferably formed by sputtering, pulse laser deposition, vacuum vapor deposition, an inkjet method, or a printing method. As the sputtering, RF magnetron sputtering or DC sputtering is usable. Of these sputtering methods, DC sputtering is more preferably used. As a starting material (target material) for sputtering, an oxide ceramics material or metal target material is usable. As the vacuum vapor deposition, heating vapor deposition, electron beam vapor deposition, or ion plating is usable. As the printing method, transfer printing, flexographic printing, gravure printing, gravure offset printing, or the like is usable, or another method may also be used. As the CVD, hot wire CVD, plasma CVD, or the like is usable. An oxide semiconductor may be formed using another method of dissolving a hydrate of an inorganic salt (e.g., chloride) of the above-mentioned metal in alcohol or the like, and baking and sintering it to form an oxide semiconductor.

As described above, the array substrate 2 includes the insulating layer 6a, source signal lines 7a and 7b, insulating layer 6b, common electrodes 8a and 8b, insulating layer 6c, pixel electrodes 9a and 9b, and alignment film 10 on the transparent substrate 5 in the order named. The array substrate 2 includes the active elements 11a and 11b for applying a liquid crystal driving voltage to the pixel electrodes 9a and 9b. The source signal lines 7a and 7b and gate lines of the array substrate 2 are electrically connected to the active elements 11a and 11b.

The active elements 11a and 11b have, e.g., a bottom-gate, top-contact etch-stopper structure. The active elements 11a and 11b may use, e.g., a top-gate or double-gate transistor structure. A photosensor or another active element may be formed from a transistor including a transparent channel layer of an oxide semiconductor.

In the manufacture of the active elements 11a and 11b, first, an ITO thin film is formed to a thickness of 140 nm by DC magnetron sputtering. Then, the ITO thin film is patterned into a desired shape to form a gate electrode and auxiliary capacitor electrode. A SiH$_x$ thin film is formed to a thickness of 350 nm by plasma CVD using SiH$_4$, NH$_3$, or H$_2$ as a source gas, thereby forming a gate insulating film as a transparent insulating layer. Further, as a channel layer, an amorphous In—Ga—Zn—O thin film is formed to a thickness of 40 nm by DC sputtering using an InGaZnO$_4$ target, and is patterned into a desired shape, thereby forming a transparent channel layer. Further, while introducing Ar and O$_2$ by RF sputtering using a Si$_3$H$_4$ target, a SiON thin film is formed and patterned into a desired shape, thereby forming a channel protection layer. Further, an ITO thin film is formed to a thickness of 140 nm by DC magnetron sputtering, and is patterned into a desired shape, thereby forming source and drain electrodes.

In the above-described liquid crystal display device 1 according to the first embodiment, the alignment film 16 of the color filter substrate 3 on which the counter electrodes 15a and 15b are formed, and the alignment film 10 of the array substrate 2 on which the active elements 11a and 11b are formed face each other. The liquid crystal layer 4 is sandwiched between the alignment films 10 and 16.

At the time of driving the liquid crystal, the liquid crystal driving voltage is applied between the pixel electrodes 9a and 9b and common electrodes 8a and 8b of the array substrate 2, and between the pixel electrodes 9a and 9b of the array substrate 2 and the counter electrodes 15a and 15b of the color filter substrate 3.

In the first embodiment, an oblique electric field is generated between the electrodes at the time of driving the liquid crystal. By using the oblique electric field, the pretilt angle θ of the liquid crystal molecules L1 to L12 that is given by the alignment films 10 and 16 can become smaller than the pretilt angle of a conventional vertically aligned liquid crystal display device. As a result, black display when the driving voltage is stopped can be made blacker.

The liquid crystal display device 1 according to the first embodiment is applicable to a display device installed in a mobile phone, a game device, a tablet terminal, a notebook PC (personal computer), a television, the dashboard of a car, or the like.

[Second Embodiment]

The second embodiment is a modification of the polygonal pixel shape, and a parallelogramatic pixel will be explained.

Figure 12:
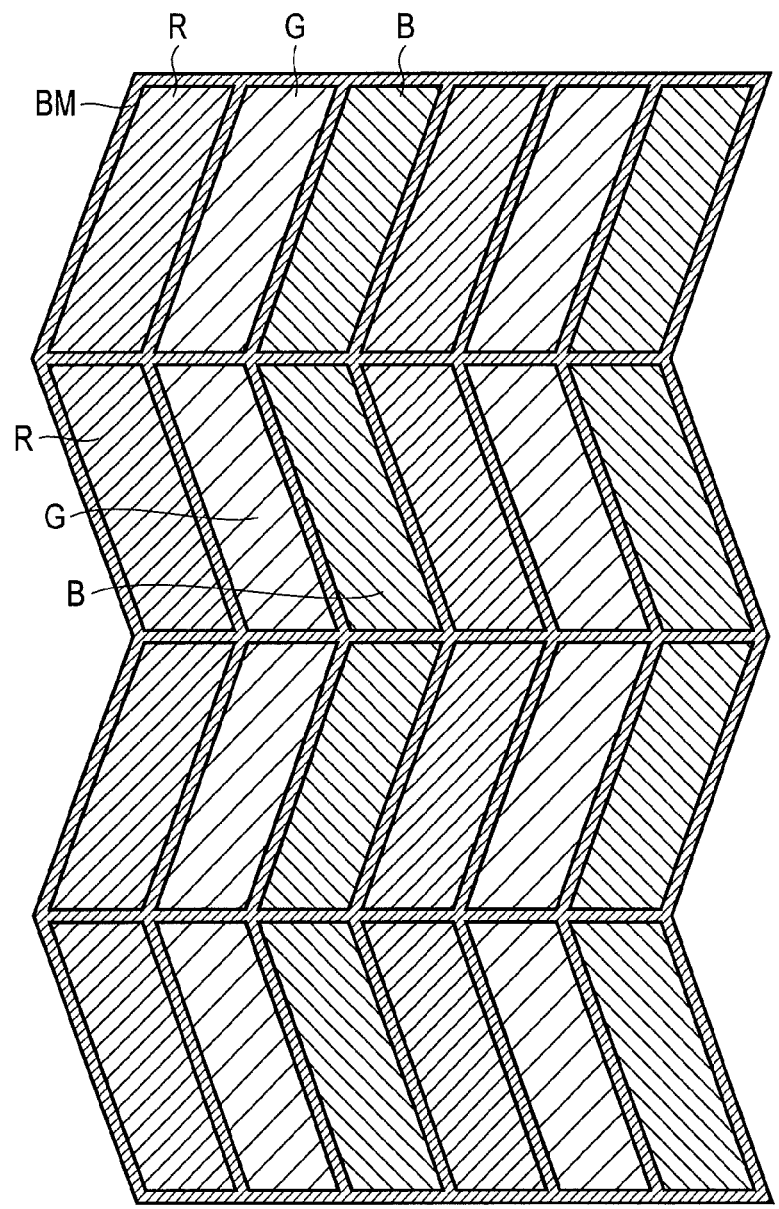
FIG. 12 is a plan view showing an example of the arrangement of red filters, green filters, and blue filters partitioned by a black matrix according to the second embodiment.

FIG. 12 is a plan view showing an example of the arrangement of red filters R, green filters G, and blue filters B partitioned by a black matrix BM according to the second embodiment.

FIG. 13 is a pixel plan view showing an example of the planar shapes of pixel electrodes 9a and 9b and common electrodes 8a and 8b according to the second embodiment.

In FIGS. 12 and 13, the shape of each pixel is a vertically long parallelogramatic shape. This pixel has short sides parallel to each other, and long sides parallel to each other. The short sides are parallel to the lateral direction, and serve as the upper and lower end portions of the pixel. The long sides have an angle α1 with respect to the longitudinal direction, and serve as the side end portions of the pixel. The long sides, and a center line CL parallel to the long sides have an angle α2 which is not a right angle with respect to the lateral direction.

In the pixel array of FIG. 12, two pixels adjacent in the lateral direction are line-symmetric with respect to a center line between the two pixels adjacent in the lateral direction. Two pixels adjacent in the longitudinal direction are line-symmetric with respect to a center line between the two pixels adjacent in the longitudinal direction. A pixel set formed by two pixels adjacent in the longitudinal direction has a "<" shape or ">" shape.

In the second embodiment, different colors are arranged in the lateral direction, and the same color is arranged in the longitudinal direction. Note that pixels of the same color may be arranged in an oblique direction when viewed from the top.

A section taken along a line B-B' in FIG. 13 is the same as that in FIG. 5. Even in this case, however, liquid crystal molecules L1 to L12 have an initial small pretilt angle θ.

The positional relationship between the pixel electrodes 9a and 9b, the common electrodes 8a and 8b, and counter electrodes 15a and 15b according to the second embodiment, and the operation of the liquid crystal molecules L1 to L12 upon applying a driving voltage are the same as those in the first embodiment.

In the second embodiment, one pixel is represented by a parallelogramatic shape, and a pixel set constituted by two pixels adjacent in the longitudinal direction has a "<" shape or ">" shape. However, one pixel may have a "<" shape or ">" shape, different colors may be arranged in the lateral direction, and the same color may be arranged in the longitudinal direction.

[Third Embodiment]

The third embodiment is a modification of the polygonal pixel shape, and a "V"-shaped pixel will be explained.

Figure 14:
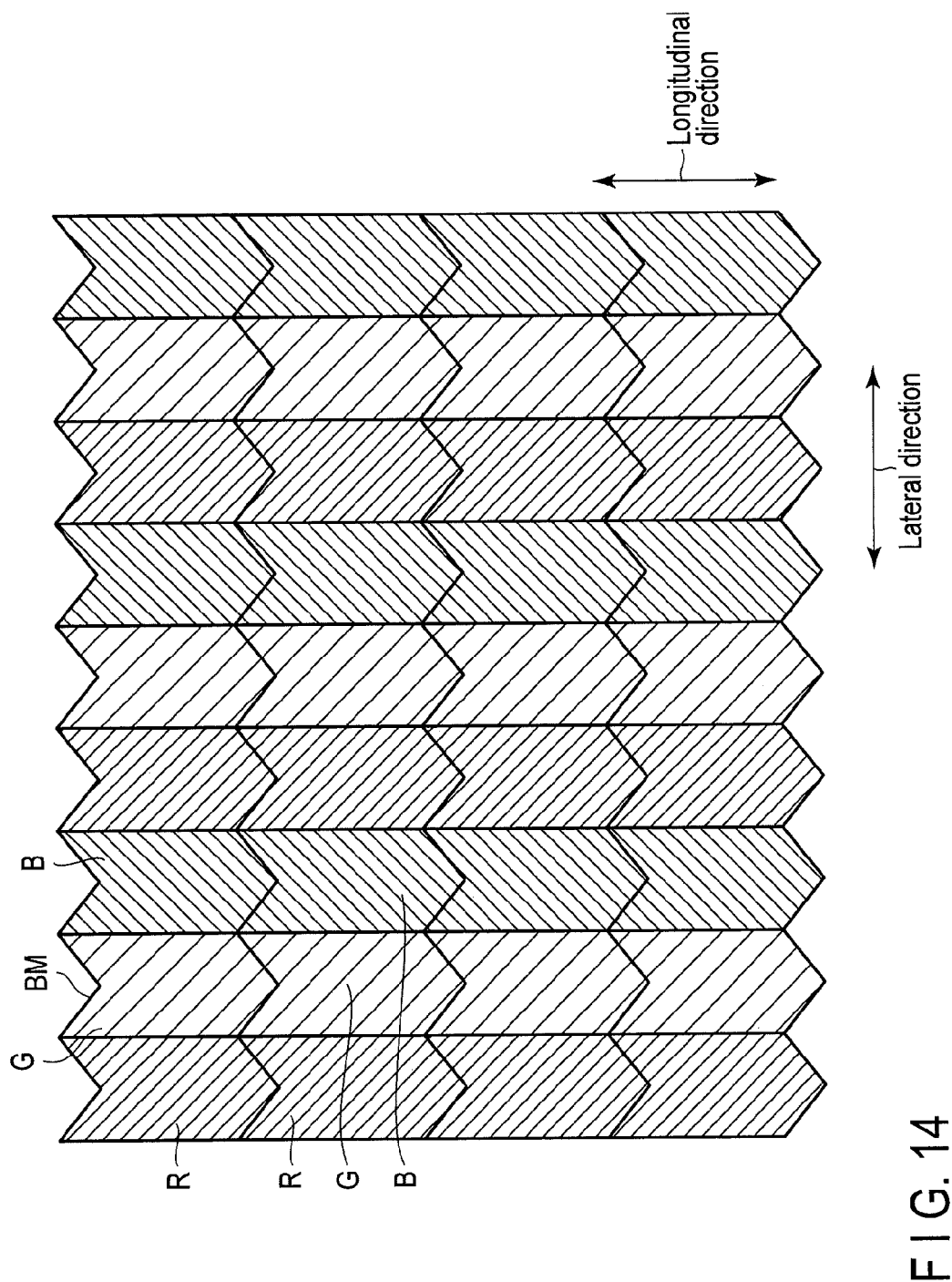
FIG. 14 is a plan view showing an example of the arrangement of red filters, green filters, and blue filters partitioned by a black matrix according to the third embodiment.

FIG. 14 is a plan view showing an example of the arrangement of red filters R, green filters G, and blue filters B partitioned by a black matrix BM according to the third embodiment.

Figure 15:
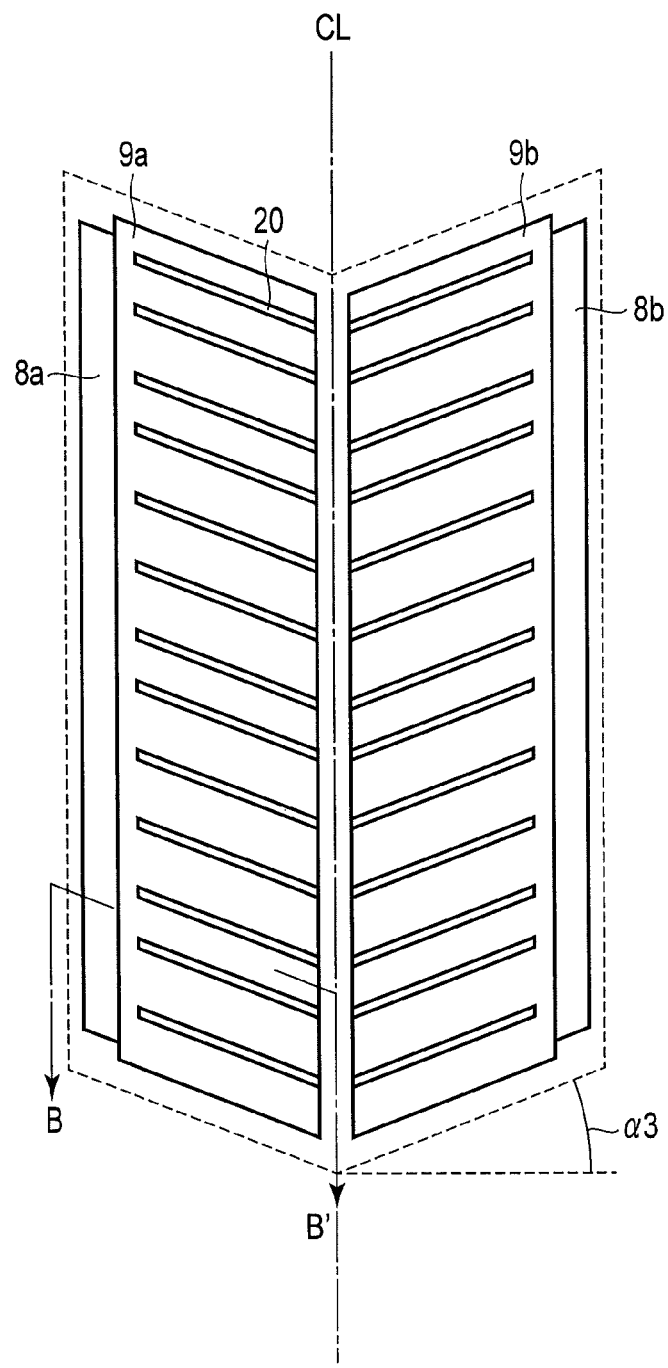
FIG. 15 is a pixel plan view showing an example of the planar shapes of pixel electrodes and common electrodes according to the third embodiment.

FIG. 15 is a pixel plan view showing an example of the planar shapes of pixel electrodes 9a and 9b and common electrodes 8a and 8b according to the third embodiment.

FIG. 16 is a partial plan view showing an example of the arrangement positions of a counter electrode 15a and the pixel electrode 9a according to the third embodiment. FIG. 16 shows only the left side of the pixel.

Each "V"-shaped pixel according to the third embodiment has a "V"-shaped side in the lateral direction as the upper frame portion of the pixel, and a "V"-shaped side in the lateral direction as the lower frame portion of the pixel. The two "V"-shaped sides are parallel to each other. Each pixel has two lateral sides parallel to the longitudinal direction. Each pixel is longer in the longitudinal direction than in the lateral direction. Note that each pixel according to the third embodiment may have an inverted "V" shape. The upper and lower portions of each pixel are partitioned by the "V"-shaped black matrix BM. Pixels of different colors are arranged in the lateral direction. Pixels of the same color are arranged in the longitudinal direction. Note that pixels of the same color may be arranged in an oblique direction when viewed from the top.

The "V"-shape side and the lateral direction form an angle α3. The angle α3 may range from about 5° to 45° in order to improve the viewing angle. Further, the alignment direction of liquid crystal molecules L1 to L12 may be set to the same direction as that of the "V"-shaped upper and lower sides.

For example, the angle α3 between the lateral direction and the "V"-shaped side is set to be 45°, and the absorption axes of polarizing plates adhered to the upper and lower surfaces of the liquid crystal display device according to the third embodiment are set to be 0° and 90° in crossed nicols. In this case, the third embodiment can reduce the loss of the polarizing plates, compared to the first and second embodiments in which the absorption axes of polarizing plates are 45° and 135°. It is often the case with even a general liquid crystal panel that the absorption axes of polarizing plates are 45° and 135° in crossed nicols. Such a general liquid crystal panel is manufactured by cutting out changing films into a rectangular shape from the rolled film of a polarizing film product in a direction of 45°, and adhering the cut-out polarizing films to a liquid crystal panel. In the manufacture of the liquid crystal panel, much of the polarizing film is wasted.

In the third embodiment, as shown in FIGS. 15 and 16, the pixel electrodes 9a and 9b are formed into a shape complying with the "V" pixel shape. The pixel electrodes 9a and 9b have line-symmetric shapes with respect to a center line CL of the pixel. A plurality of streaks 20 are formed along the "V"-shaped side on the surfaces of the pixel electrodes 9a and 9b.

Figure 17:
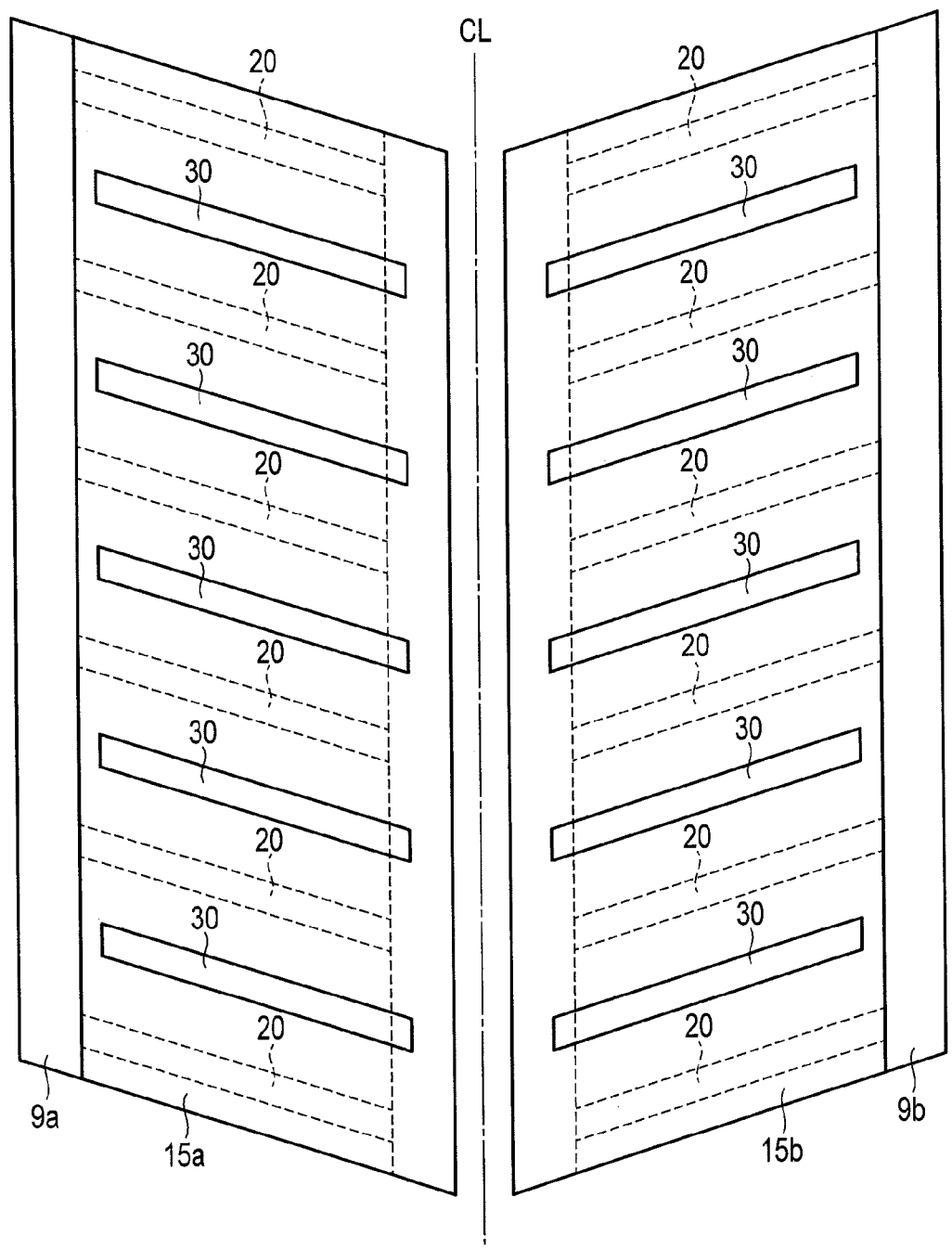
FIG. 17 is a plan view showing an example of counter electrodes and pixel electrodes arranged in a "V"-shaped pixel.

In the third embodiment, as shown in FIG. 17, the counter electrode 15a and a counter electrode 15b may have a parallelogramatic pattern having slits 30 (openings) parallel to the plurality of streaks 20 formed on the surfaces of the pixel electrode 9a and a pixel electrode 9b. The alignment of the liquid crystal upon applying a driving voltage can be set to be parallel to the streaks 20 by making the lengthwise direction of the streaks 20 of the pixel electrodes 9a and 9b parallel to the lengthwise direction of the slits 30 of the counter electrodes 15a and 15b. Note that the positions of the streaks 20 of the pixel electrodes 9a and 9b can be center positions between the slits 30 of the counter electrodes 15a and 15b when viewed from the top.

A section taken along a line B-B' in FIG. 15 is the same as that in FIG. 5. The liquid crystal display device according to the third embodiment includes protruding portions a, and thus can reduce the influence of source signal lines 7a and 7b and prevent generation of dark portions 24 in the longitudinal direction.

[Fourth Embodiment]

The fourth embodiment is a modification of the polygonal pixel shape, and a hexagonal pixel will be explained.

Figure 18:
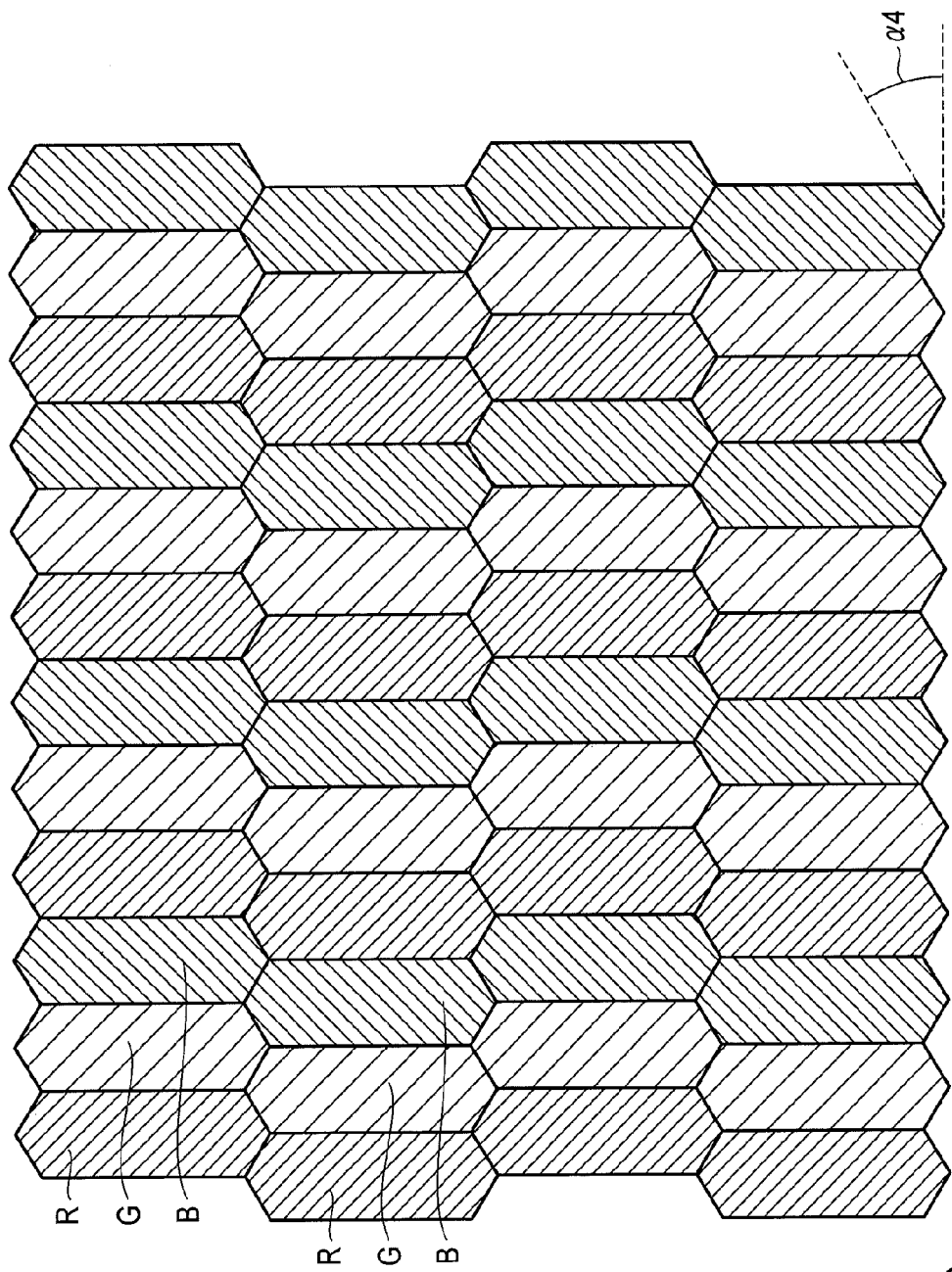
FIG. 18 is a plan view showing an example of the arrangement of red filters, green filters, and blue filters partitioned by a black matrix according to the fourth embodiment.

FIG. 18 is a plan view showing an example of the arrangement of red filters R, green filters G, and blue filters B partitioned by a black matrix BM according to the fourth embodiment.

Figure 19:
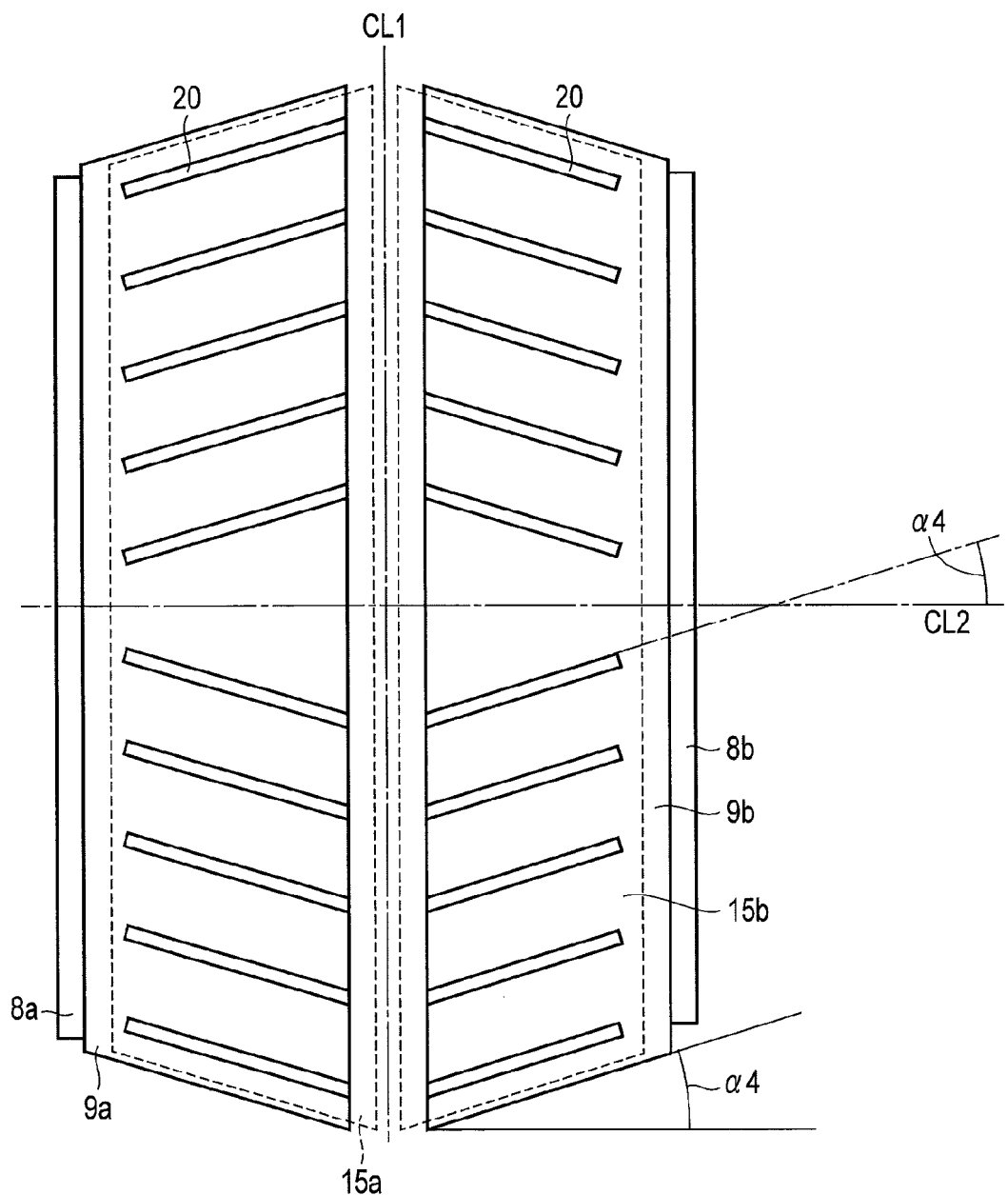
FIG. 19 is a pixel plan view showing an example of the planar shapes of pixel electrodes, common electrodes, and counter electrodes in a pixel according to the fourth embodiment.
Figure 20:
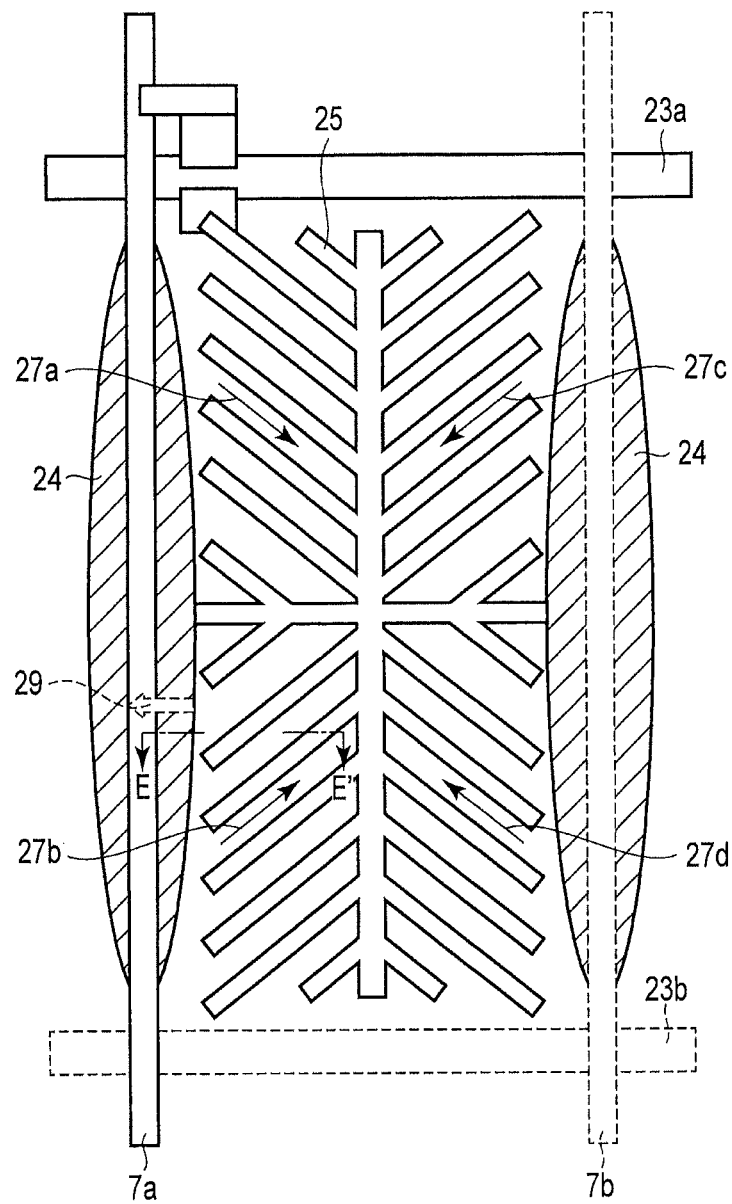
FIG. 20 is a plan view showing an example of a conventional pixel electrode which improves the nonuniformity of the tilt in a domain.
Figure 21:
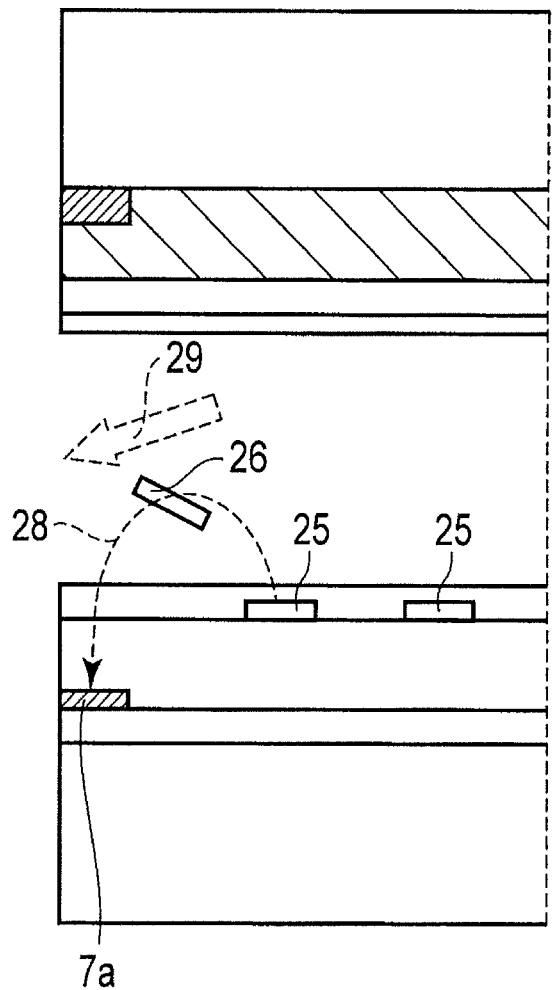
FIG. 21 is a sectional view partially showing an example of the state of an electric line of force between the distal end of a pixel electrode and a source signal line.

FIG. 19 is a pixel plan view showing an example of the planar shapes of pixel electrodes 9a and 9b, common electrodes 8a and 8b, and counter electrodes 15a and 15b in the pixel according to the fourth embodiment.

In FIGS. 18 and 19, the pixel has two long sides parallel to the longitudinal direction. The upper and lower sides of the pixel have an inverted "V" shape and "V" shape, respectively. The shape of each pixel is a vertically long hexagonal shape. A plurality of pixels form a honeycomb matrix.

In FIG. 18, pixels of different colors are arranged in the lateral direction. Colored pixels of the same color such as red pixels R, green pixels G, or blue pixels B are arrayed in the longitudinal direction while being shifted by a ½ pixel.

Each of the inverted "V"-shaped side and "V"-shaped side in the lateral direction that partition the top and bottom of each pixel has an angle α4 with respect to the lateral direction when viewed from the top. Active elements 11a and 11b such as TFTs, and source electrodes are not illustrated in FIGS. 18 and 19. Source signal lines 7a and 7b are arranged at lower portions of the black matrix BM of the hexagonal pixel in the longitudinal direction when viewed from the top.

As shown in FIG. 19, the pixel electrodes 9a and 9b have line-symmetric shapes with respect to a center line CL1 of the hexagonal pixel in the longitudinal direction, and have line-symmetric shapes with respect to a center line CL2 of the hexagonal pixel in the lateral direction.

A plurality of streaks 20 parallel to the inverted "V"-shaped side and "V"-shaped side of the hexagonal pixel in the lateral direction are formed on the surfaces of the pixel electrodes 9a and 9b. The angle α4 between each of the plurality of streaks 20 and the lateral direction can be set in the range of 0°±45°. By setting the angle α4 between the lateral direction and the streak 20, the liquid crystal display device can implement a wide viewing angle.

The common electrodes 8a and 8b have portions b overlapping the pixel electrodes 9a and 9b. The common electrodes 8a and 8b are arranged below the pixel electrodes 9a and 9b via an insulating layer 6b. The common electrodes 8a and Sb have line-symmetric shapes with respect to the center line CL1 in the longitudinal direction. As shown in FIG. 19, the common electrodes 8a and 8b shift from the pixel electrodes 9a and 9b toward the lateral sides of the pixel.

The liquid crystal driving voltage is applied to the pixel electrodes 9a and 9b via the active elements 11a and 11b.

The counter electrodes 15a and 15b have line-symmetric shapes with respect to the center line CL1 in the longitudinal direction. As shown in FIG. 19, the counter electrodes 13 shift from the pixel electrodes 9a and 9b toward the center line CL1 of the pixel.

As in the first embodiment, alignment films 10 and 16 of the liquid crystal display device according to the fourth embodiment have pretilt angles θ which are parallel to the plurality of streaks 20 and are line-symmetric with respect to the center line CL1 in the longitudinal direction.

[Fifth Embodiment]

The fifth embodiment will exemplify a transparent resin and organic pigment used for the color filter substrate 3 according to each of the first to fourth embodiments.

(Transparent Resin)

A photosensitive coloring composition used to form a black matrix BM and color filter 13 contains a polyfunctional monomer, a photosensitive resin or non-photosensitive resin, a polymerization initiator, a solvent, and the like in addition to a pigment dispersant. For example, highly transparent organic resins usable in the embodiment, such as a photosensitive resin and non-photosensitive resin, will be generically called transparent resins.

As the transparent resin, a thermoplastic resin, thermosetting resin, or photosensitive resin is usable. Examples of the thermoplastic resin are a butyral resin, a styrene-maleic copolymer, chlorinated polyethylene, chlorinated polypropylene, polyvinyl chloride, a vinyl chloride-vinyl acetate copolymer, polyvinyl acetate, a polyurethane-based resin, a polyester resin, an acryl-based resin, an alkyd resin, a polystylene resin, a polyamide resin, a rubber-based resin, a cyclized rubber-based resin, celluloses, polybutadiene, polyethylene, polypropylene, and a polyimide resin. Examples of the thermosetting resin are an epoxy resin, a benzoguanamine resin, a rosin modified maleic resin, a rosin modified fumarate resin, a melamine resin, a urea resin, and a phenol resin. The thermosetting resin may be produced by causing a melamine resin and a compound containing an isocyanate group to react with each other.

(Alkali Soluble Resin)

Photosensitive resin compositions capable of pattern formation by photolithography are preferably used to form a light-shielding pattern such as the black matrix BM, a transparent pattern, and the color filter 13 used in the embodiment. These transparent resins are desirably resins with alkali solubility. As the alkali soluble resin, a resin containing a carboxyl group or hydroxyl group may be used, or another resin may be used. Examples of the alkali soluble resin are an epoxy acrylate-based resin, a novolac-based resin, a polyvinyl phenol-based resin, an acryl-based resin, a carboxyl group-containing epoxy resin, and a carboxyl group-containing urethane resin. As alkali soluble resins among them, an epoxy acrylate-based resin, a novolac-based resin, and an acryl-based resin are preferably used. In particular, an epoxy acrylate-based resin or novolac-based resin is preferable.

(Acrylic Resin)

The following acrylic resins are exemplified as representatives of a transparent resin applicable to the embodiment.

An example of the acryl-based resin is a polymer obtained using, as monomers, for example, methacrylic acid; alkyl methacrylate such as methyl methacrylate, ethyl methacrylate, propyl methacrylate, butyl methacrylate, t-butyl methacrylate, penzyl methacrylate, or lauryl methacrylate; hydroxyl group-containing methacrylate such as hydroxyethyl methacrylate or hydroxypropyl methacrylate; ether group-containing methacrylate such as ethoxyethyl methacrylate or glycidyl methacrylate; and alicyclic methacrylate such as cyclohexyl methacrylate, isobornyl methacrylate, or dicyclopentenyl methacrylate.

Note that the monomers exemplified here can be used singly or in combination of two or more types. Further, the acrylic resin may be generated using a copolymer of these monomers, and a compound capable of copolymerization with these monomers, such as styrene, cyclohexylmaleimide, or phenylmaleimide.

Also, a copolymer obtained by copolymerizing carboxylic acid having an ethylene unsaturated group, such as methacrylic acid, may be caused to react with a compound containing an epoxy group, such as glycidyl methacrylate, and an unsaturated double bond, thereby generating a photosensitive resin. For example, a photosensitive resin may be generated by adding a carboxylic acid-containing compound such as methacrylic acid to a polymer of an epoxy group-containing methacrylate such as glycidyl methacrylate, or a copolymer of this polymer and another methacrylate.

(Organic Pigment)

Examples of a red pigment are C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, and 279.

Examples of a yellow pigment are C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214.

Examples of a blue pigment are C.I. Pigment Blue 15, 15:1, 15:2, 15:3, 15:4, 15:6, 16, 22, 60, 64, and 80. Of these pigments, C.I. Pigment Blue 15:6 is preferable.

Examples of a violet pigment are C.I. Pigment Violet 1, 19, 23, 27, 29, 30, 32, 37, 40, 42, and 50. Of these pigments, C.I. Pigment Violet 23 is preferable.

Examples of a green pigment are C.I. Pigment Green 1, 2, 4, 7, 8, 10, 13, 14, 15, 17, 18, 19, 26, 36, 45, 48, 50, 51, 54, 55, and 58. Of these pigments, C.I. Pigment Green 58, which is a zinc halide phthalocyanine green pigment, is preferable.

(Color Material of Black Matrix BM)

A light-shielding color material contained in the layer of the black matrix BM is a color material which has absorption in the visible light wavelength region and exhibits a light-shielding function. In the embodiment, examples of the light-shielding color material are an organic pigment, an inorganic pigment, and a dye. Examples of the inorganic pigment are carbon black and titanium oxide. Examples of the dye are an azo-based dye, an anthraquinone-based dye, a phthalocyanine-based dye, a quinone imine-based dye, a quinoline-based dye, a nitro-based dye, a carbonyl-based dye, and a methine-based dye. As the organic pigment, the above-mentioned organic pigments are available. As the light-shielding component, one type may be used, or two or more types may be combined at a proper ratio. The volume resistance may be increased by resin coating of the surfaces of these color materials. To the contrary, the volume resistance may be decreased by increasing the content ratio of the color material to the matrix of a resin and adding slight electrical conductivity. However, the volume resistivity of such a light-shielding material falls within the range of about $1 \times 10^8$ to $1 \times 10^{15}$ Ω·cm, and does not influence the resistance value of a transparent conductive film. Similarly, the dielectric constant of the light-shielding layer can also be adjusted in the range of 3 to 20 by a choice of the color material or the content ratio. The coating film of the black matrix BM, the coating film of a colored pixel, and the dielectric constant of a transparent resin layer can be adjusted in the range of the above-described dielectric constant in accordance with the design conditions and liquid crystal driving conditions of a liquid crystal display device 1.

The above-described embodiments can be variously changed and applied without departing from the spirit of the present invention.

What is claimed is:
1. A liquid crystal display device comprising:
an array substrate including a plurality of pixel electrodes and a plurality of common electrodes corresponding to each of a plurality of pixels arranged in a matrix, and an alignment film;
a color filter substrate facing the array substrate and including a plurality of color filters and a plurality of counter electrodes corresponding to each of the plurality of pixels; and
a liquid crystal layer interposed between the array substrate and the color filter substrate,
wherein each of the plurality of pixels has a polygonal shape longer in a longitudinal direction than in a lateral direction when viewed from the top,
when viewed from the top, each of the plurality of pixels is line symmetric with respect to a center line which is parallel to a lateral side of the polygonal shape and divides the pixel into two portions,
for each of the plurality of pixels,
the corresponding plurality of pixel electrodes are divided line symmetrically with respect to the corresponding center line when viewed from the top,
a plurality of streaks each having a lengthwise direction toward the corresponding center line are formed on a surface of each of the corresponding plurality of pixel electrodes on a side of the liquid crystal layer when viewed from the top,
the corresponding plurality of common electrodes are divided line symmetrically with respect to the corresponding center line when viewed from the top,
the corresponding plurality of common electrodes are formed at respective a positions distant from the liquid crystal layer, compared to each of the corresponding plurality of pixel electrodes, in a vertical direction perpendicular to a substrate plane,
a position of each of the corresponding plurality of common electrodes in the lateral direction shifts in a direction apart from the corresponding center line with respect to each of the corresponding plurality of pixel electrodes when viewed from the top,
in each of the two portions of each of the plurality of pixels,
a position in the lateral direction of a counter electrode, which is among the plurality of counter electrodes, shifts from a position in the lateral direction of a pixel electrode, which is one among the plurality of pixel electrodes, when viewed from the top, a direction in which the counter electrode shifts from the pixel electrode is opposite to a direction in which a common electrode, being one among the plurality of common electrodes, shifts from the pixel electrode, and electric fields from the pixel electrodes to a protruding portion of the common electrode are formed, thereby tilting the liquid crystal molecules in a direction along which the protruding portion protrudes from the pixel electrode, the liquid crystal layer includes a liquid crystal molecule having negative dielectric constant anisotropy, and the alignment film gives a pretilt angle to the liquid crystal molecule to tilt a lengthwise direction of the liquid crystal molecule from the vertical direction in a direction in which each of the plurality of common electrode shifts from each of the pixel electrodes.

2. The liquid crystal display device according to claim 1, further comprising an insulating layer, a first transparent substrate, and a second transparent substrate, wherein in the each of the two portions of each of the plurality of pixels,
the pixel electrode and the common electrode face each other in the vertical direction,
the pixel electrode and the counter electrode face each other in the vertical direction,
the insulating layer is between the pixel electrode and the common electrode,
the common electrode includes a portion protruding from the pixel electrode, and a portion overlapping the pixel electrode when viewed from the top,
the array substrate includes an arrangement in which each of the plurality of common electrodes, the insulating layer, each of the plurality of pixel electrodes, and the alignment film are arranged on the first transparent substrate, and
the color filter substrate includes an arrangement in which the color filter, a transparent resin layer, and each of the plurality of counter electrodes are arranged on the second transparent substrate.

3. The liquid crystal display device according to claim 1, wherein the lengthwise direction of the streak has an angle of 0°±45° with respect to the lateral direction.

4. The liquid crystal display device according to claim 1, wherein
the color filter substrate further comprises a black matrix configured to partition the plurality of pixels and form a plurality of pixel opening regions,
the plurality of color filters include a red filter, a green filter, and a blue filter, and
one of the red filter, the green filter, and the blue filter is assigned to one of the plurality of pixel opening regions.

5. The liquid crystal display device according to claim 1, further comprising an active element used to apply a liquid crystal driving voltage to one of the plurality of pixel electrodes,
wherein the active element is an oxide semiconductor thin film transistor, and
a channel material of the oxide semiconductor thin film transistor is a mixed metal oxide.

* * * * *